United States Patent [19]
Hirabayashi et al.

[11] Patent Number: 5,648,859
[45] Date of Patent: Jul. 15, 1997

[54] LIQUID CRYSTAL MICROPRISM ARRAY, FREE-SPACE OPTICAL INTERCONNECTOR, AND OPTICAL SWITCH

[75] Inventors: Katsuhiko Hirabayashi, Tokyo; Tsuyoshi Yamamoto, Iruma; Masayasu Yamaguchi, Funabashi; Hirofumi Yamazaki, Hachioji, all of Japan

[73] Assignee: Nippon Telephone & Telegraph Corp., Tokyo, Japan

[21] Appl. No.: 281,268

[22] Filed: Jul. 27, 1994

[30] Foreign Application Priority Data

Jul. 28, 1993 [JP] Japan ................... 5-186164
Jun. 8, 1994 [JP] Japan ................... 6-126636

[51] Int. Cl.$^6$ ................... G02F 1/1333; G02F 1/1335
[52] U.S. Cl. ................... 349/9; 349/74; 349/84; 349/196; 349/200
[58] Field of Search ................... 359/39, 40, 41, 359/62, 53

[56] References Cited

U.S. PATENT DOCUMENTS

| | | | |
|---|---|---|---|
| 4,516,837 | 5/1985 | Soref et al. | 350/347 |
| 4,729,640 | 3/1988 | Sakata | 359/95 |
| 4,923,269 | 5/1990 | Healey | 359/39 |
| 5,299,037 | 3/1994 | Sakata | 359/95 |
| 5,307,186 | 4/1994 | Izumi | 359/42 |
| 5,317,435 | 5/1994 | Kasazumi | 359/69 |
| 5,430,561 | 7/1995 | Kato | 359/39 |

FOREIGN PATENT DOCUMENTS

| | | | |
|---|---|---|---|
| 60-189730 | 9/1985 | Japan | 359/40 |
| 60-247228 | 12/1985 | Japan . | |
| 0232421 | 10/1986 | Japan | 359/40 |
| 249820 | 10/1988 | Japan . | |
| 0318519 | 12/1988 | Japan | 359/40 |
| 216075 | 8/1993 | Japan . | |
| 216076 | 8/1993 | Japan . | |
| 204001 | 8/1993 | Japan . | |
| 5323261 | 12/1993 | Japan | 359/40 |
| 6-130431 | 5/1994 | Japan . | |
| 2 184 560 | 6/1987 | United Kingdom . | |

OTHER PUBLICATIONS

S. Sato, T. Nose, R. Yamaguchi and S. Yanase, "Relationship between lens properties and director orientation in a liquid crystal lens", Liquid Crystals, 1989, vol. 5, 1435–1442.

M. Tanaka and S. Sato, "Molecular alignment and Electroptical properties in wedge shaped liquid crystal cell", a technical report of The Institute of Television Engineers of Japan, EEDD672, IPDD70–13, 1982.

T. Nose and S. Sato, "Optical Fiber Switches by Nematic Liquid–Crystal Cells", The Institute of Electronics and Communication Engineers of Japan, EMC88–42; pp. 7–12.

"Experimental Investigation of a Free–Space Optical Switching Network by Using Symmetric Self–Electro-Optic–Effect Devices", F. B. McCormick, F.A.P. Tooley, T.J. Cloonan, J.L. Brubaker, A.L. Lentine, R.L. Morrison, S.J. Hinterlong, M.J. Herron, S.L. Walker and J. M. Sasian, Applied Optics, vol. 31, No. 26, 10 Sep. 1992.

"Three–Terminal Operation Analysis of Exciton Absorption Reflection Switches (EARS's)", Chikara Amano, Shinji Matsuo, Tatsushi Nakahara and Takashi Kurokawa, IEEE Journal of Quantum Electronics, vol. 29, No. 2, Feb. 993.

(List continued on next page.)

*Primary Examiner*—Anita Pellman Gross
*Assistant Examiner*—Tiep H. Nguyen
*Attorney, Agent, or Firm*—Frieshauf, Holtz, Goodman, Langer & Chick, P.C.

[57] ABSTRACT

A liquid crystal microprism array has a plurality of grooves formed on a surface of a transparent substrate, a plurality of spaces divided by ridges of the grooves, and a plurality of liquid crystal cells placed in the spaces.

19 Claims, 37 Drawing Sheets

OTHER PUBLICATIONS

"Experimental Investigation of a Digital Free–Space Photonic Switch That Uses Exciton Absorption Reflection Switch Arrays", Masayusu Yamaguchi, Tsuyoshi Yamamoto, Ken–ichi Yukimatsu, Shinji Matsuo, Chikara Amano, Yoshinori Nakano and Takashi Kurokawa, Applied Optics, vol. 33, No. 8,10 Mar. 1994.

Operation Characteristics of Three–Terminal Hybrid Structure with Multiple–Quantum–Well Reflection Modulator and Heterojunction Phototransistor, IEEE Photonics Technology Letters, vol. 3, No. 4, Apr. 1991, S. Matsuo et al.

High Speed Response in Optoelectronic Gated Thyristor, Japanese Journal of Applied Physics, vol. 26, No. 6, Jun. 1987, pp. L1014–L1016, Yoshiharu Tashiro, et al.

Evolution of the SEED Technology: Bistable Logic Gates to Optoelectronic Smart Pixels, Journal of Quantum Electronics, vol. 29, No. 2, Feb. 1993, Anthony L. Lentine, et al.

IBM TDB vol. 15, No. 4 "Liquid–Crystal Cell Having Nonuniform Thickness", Sep. '72, Ludeman et al.

LIQUID CRYSTAL MICROPRISM ARRAY, FREE-SPACE OPTICAL INTERCONNECTOR, AND OPTICAL SWITCH

BACKGROUND OF THE INVENTION

1. Field of the Invention

The present invention relates to optical switches, liquid crystal microprism arrays, and free-space optical interconnectors used in optical-communication switching systems based on the propagation of rays of light as communication signals.

2. Description of the Prior Art

Heretofore, optical-communication switching systems have been regarded as important ways for communication services. In addition to optical fiber transmission lines, the optical-communication switching system for switching optical-communication signals as it is can be of use to realize high-speed and widespread communication services such as of high-resolution image data transfer and multi-megabite data transfer. For constituting a large scaled network of optical switches as a specific optical communication path in the optical-communication switching system, generally, the network is composed of a lot of small optical switches. These optical elements are connected with each other by a plurality of optical fiber links as in the case of crossbar switches used for switching electric signals.

FIG. 1 shows an 8×8 optical switch (a Clos type switch) which is formed as a parallel arrangement of optical switch groups, consisting of a plurality of small optical switches in the type of 2×3, 4×4, and 3×2 respectively. Therefore, the 8×8 parallel optical switch comprises groups of: input fibers 1; 2×3 optical matrix switches 2; optical fiber interconnections 5; 4×4 optical matrix switches 3; optical fiber interconnections 7; 3×2 optical matrix switches 4; and output fibers 6, being arranged in that order.

The group of 2×3 optical matrix switches 2 includes four switches paralleled with each other in the direction of propagating the incident rays of light through the input fibers 1. Each of the 2×3 optical matrix switches has two input terminals connected with the respective input fibers 1 and three output terminals connected with the respective optical fibers 5.

The group of 4×4 optical matrix switches includes three switches paralleled with each other. Each of the 4×4 optical matrix switches has four input terminals connected with the respective optical fibers 5 and four output terminals connected with the respective optical fibers 7. Furthermore, the group of 3×2 optical matrix switches includes four switches paralleled with each other. Each of the 3×2 optical matrix switches 4 has three input terminals connected with the respective optical fibers 7 and two output terminals connected with the respective output fibers 6.

As shown in the figure, therefore, the output terminals of the 2×3 optical matrix switches 2 are connected with the different input terminals of the 4×4 optical matrix switches 3 through the fibers 5 respectively, while the output terminals of the 4×4 optical matrix switches 3 are connected with the different input terminals of the 3×2 optical matrix switches 4 through the fibers 7 respectively. Thus the two groups of the optical fibers form the first and second interconnections 5 and 3 among the groups of the optical switches 2, 3, and 4.

In spite of comprising small sized optical switches, however, the conventional network cannot be reduced its scale because of its complex arrangement of the optical fibers for the interconnection between the optical switches.

For making the network on a small scale without reducing its communication abilities, there is an idea of interconnecting between the optical elements by passing the optical signals through free-space. This kind of the propagation has the advantages, for example: (i) optical data is transmitted at an extremely higher speed compared with the electric one; and (ii) a volume of the space for the interconnections is much smaller than that of the optical elements such as the optical fibers and optical waveguides.

One of the proposed system using the free-space optical interconnections is an array of two-dimensional semiconductor optical gate switches that includes an array of multiple quantum well (MQW) optical modulators and an array of optical detectors (A. L. Lentine & D. A. B. Miller: "Evolution of the SEED Technology: Bistable Logic Gates to Optoelectronics Smart Pixels", IEE J. QE., vol. 29, pp 655–669, 19, and Japanese Patent Application Laying-open No. 6-130431). In addition, another proposed system using the free-space optical interconnections is an array of two-dimensional optical gate switches composed of a combination of an optical detector array and a surface-emitting laser array (Y. Tashiro et al., "High speed response in optoelectronics gated thyristor", Jpn. J. Appl. Phys., vol. 26, p. L274, 1987). In these systems, the two-dimensional semiconductor optical gate switch arrays are arranged as multiple stages interconnected by a plurality of light-beams passing through the free-space.

Hereinafter, a general term "two-dimensional optical element array" includes meanings of a two-dimensional optical gate switch array, a two-dimensional optical source array, a two-dimensional optical fiber array, and so on.

To keep pace with the above communication demands, technology for interconnecting between the arrays of two-dimensional optical elements becomes more important for achieving the free-space optical interconnection. For connecting the elements, as shown in FIG. 1, a plurality of light-beams must be replaced and distributed so as to make the optical interconnections of the optical elements with each other.

FIG. 2 shows a conventional optical switch system as a combination of arrays of two-dimensional optical elements with free-space optical interconnections as disclosed in Japanese Patent Application Laying-open No. 6-130431. The system comprises a first optical interconnect circuit 19, an array of micro-lenses 21, an array of two-dimensional optical gate switches 13, an array of micro-lenses 22, an array of λ/4 plate 14, a polarization beam splitter 16, and a second optical interconnect circuit 26. These elements are arranged in that order. As shown in the figure, a plurality of light-beams 8 is introduced into the first optical interconnection circuit 19 while a plurality of output light-beams 18 is produced from the second interconnect circuit 26.

The interconnection circuit 19 comprises three birefringent plates 10–12 and a patterned ½ wavelength (λ/2) plate 20 between the plates 11 and 12. The polarization beam splitter 16 has a reflection surface 15 by which a direction of propagating the light-beam is changed when the beam counters. The second optical interconnect circuit 26 comprises a patterned λ/2 plate 24, a birefringent plate 17, and a λ/4 plate 25.

The optical interconnection can be performed by changing the direction of propagating the light-beam by taking advantage of splitting the light-beam into polarized components. If a circularly polarized light passes through the birefringent plate, it will be split into two polarized components: p- and s- polarized beams, resulting that these two components propagate toward the different directions respectively. Each patterned λ/2 plate 20 or 24 comprises λ/2 plate segments (i.e., hatched portions in the figure) corresponding to the p-polarized components and transparent plate segments corresponding to S-polarized components.

In the document of Lentine and Miller described above, the optical interconnection is performed by changing the direction of propagating the light-beams by means of a computer generated hologram. In the document of Tashiro et al., on the other hand, the optical interconnection is performed by means of an optical system consisting of a plurality of lenses for focusing and reconstructing the light-beams.

FIG. 3 shows a conventional optical switch system with a free-space optical interconnection in which optical elements are adjustably connected with each other as described in Japanese Patent Application Laying-open No. 60-247228.

In this system, a converging rod lens 27 has a liquid crystal wedge cell 29 on one side thereof and output optical fibers 31–34 on another side thereof. The liquid crystal wedge cell 29 comprises a liquid crystal sandwiched between two transparent electrodes 28 connecting with a power supply 30.

An incident angle of the input light can be varied in accordance with a reflective index of the liquid crystal 29 depending on a voltage placed between the two electrodes 28 by the power supply 30, resulting in that the optical fibers connected with the rod lens 27 are switched.

In the optical system described above, however, the transparent electrodes cover a whole surface of both sides of the liquid crystal 29 so that a plurality of the input beams cannot be deflected individually. Also, an increase in numbers of the output optical fibers requires an increase in the size of an area of the rod lens to be connected, which results in the rod lens of larger diameter and the liquid crystal with a larger bottom area. Therefore, a response speed of the liquid crystal can be decreased because of a higher voltage placed between the electrodes.

To solve these problems, as shown in FIG. 4, another type of optical switch system is disclosed in UK Patent Application No. G292184560. The optical switch comprises an input optical fiber 35 and an output optical fibers 36, 37; a converging rod lens 38; a polarizer 39; a glass base pate 40; and a liquid crystal 43 sandwiched between a transparent electrode 41 and a conductive reflector 42, which are arranged in that order. Furthermore, the transparent electrode 41 and the conductive reflector 42 are connected with a power supply 44 to apply a voltage on the liquid crystal 43.

An incident light-beam introduced by the optical fiber 35 is transmitted into the liquid crystal layer 43 through the rod lens 38. Then the light-beam is reflected by the conductive reflecting plate 42 to change its propagating direction toward the output optical fiber 36 or 37. The reflected beam is passed through the liquid crystal 43 and the rod lens 38 again and outputted from one of the fibers 36 and 37. In this case, the liquid crystal layer 43 acts as a prism for changing the direction of propagating the light-beam because a thickness of the liquid crystal cell is varied.

A deflection angle is depended on the refractive index of the liquid crystal cell, while the reflective index of the liquid crystal is depended on a voltage applied between the two electrodes by the power supply. Therefore the reflected light-beam can be selectively introduced into the optical fiber 36 or 37 by changing the voltage to be applied to the liquid crystal.

In spite of the above construction, however, a plurality of the input beams cannot be deflected individually because the transparent electrodes cover a whole surface of both sides of the liquid crystal.

SUMMARY OF THE INVENTION

It is therefore an object of the present invention, in view of the above problems, to provide optical switches and free-space optical interconnectors for a variable and adjustable optical interconnection and for a deflection of incident light-beams individually.

According to a first aspect of the present invention, there is provided a liquid crystal microprism array comprising:

a first transparent substrate;

a transparent electrode divided into a plurality of electrode segments on a first surface of the first transparent substrate;

an alignment layer on a first surface of the first transparent substrate to cover the transparent electrode;

a second transparent substrate having a first surface facing the first surface of the first transparent substrate;

a transparent electrode on a first surface of the second transparent substrate;

an alignment layer on a first surface of the second transparent substrate to cover the transparent electrode;

a power supply for placing a voltage between the transparent electrodes;

a plurality of grooves formed on at least one selected from the first surface of the first transparent substrate and the first surface of the second transparent substrate;

a plurality of spaces divided by ridges of the grooves; and a liquid crystal layer sandwiched by the first and second transparent substrates.

Here, the grooves may have a shape of toothed edges of a saw in cross section, and each one of the grooves may be formed as in the shape of a right-angled triangle having an inclined surface and a vertical surface in cross section.

Each liquid crystal cell may be shaped like a right-triangle in cross section and placed in the space with a connection with adjacent liquid crystal cells to an extent of without causing a bad influence on each other.

A thickness of at least one of the first and second transparent substrates may be gradually reduced to form an inclined flat surface thereof.

At least one of the transparent electrodes may be divided into a plurality of electrode segments as rectangular patterns of dots so as to correspond to incident beams.

A liquid crystal microprism array may further comprise:

thin film transistors corresponding to the respective segments of the transparent electrode are provided on the first transparent substrates.

According to a second aspect of the present invention, there is provided a free-space optical interconnector comprising:

a plurality of liquid crystal microprism arrays which are placed one behind the other, having:

a first transparent substrate;

a transparent electrode on a first surface of the first transparent substrate;

an alignment layer on a first surface of the first transparent substrate to cover the transparent electrode;

a second transparent substrate having a first surface facing the first surface of the first transparent substrate;

a transparent electrode on a first surface of the second transparent substrate;

an alignment layer on a first surface of the second transparent substrate to cover the transparent electrode;

a power supply for placing a voltage between the transparent electrodes;

a plurality of grooves formed on at least one selected from the first surface of the first transparent substrate and the first surface of the second transparent substrate;

a plurality of spaces divided by ridges of the grooves; and a liquid crystal layer sandwiched by the first and second substrates.

Here, the grooves may have a shape of toothed edges of a saw in cross section, and each one of the grooves may be formed as in the shape of a right-angled triangle having an inclined surface and a vertical surface in cross section.

Each liquid crystal cell may be shaped like a right-triangle in cross section and placed in the space with adjacent liquid crystal cells to an extent of without causing a bad influence on each other.

A thickness of at least one of the first and second transparent substrates may be gradually reduced to form an inclined flat surface thereof.

At least one of the transparent electrodes may be divided into a plurality of electrode segments as rectangular patterns of dots so as to correspond to incident beams.

A free-space optical interconnector may further comprise:

thin film transistors corresponding to the respective segments of the transparent electrode are provided on the first and second transparent substrates.

A free-space optical interconnector may further comprise:

a first birefringent plate placed on an input side of the free-space optical interconnector;

a second birefringent plate placed on an output side of the free-space optical interconnector;

a plurality of λ/2 plates placed on an output side of the first birefringent plate where p-polarized beams impinges on a surface of the respective λ/2 plates; and a plurality of λ/2 plates placed on an input side of the second birefringent plate where s-polarized beams impinges on a surface of the respective λ/2 plates.

A free-space optical interconnector may further comprise:

a two-dimensional optical detector array for detecting an output light intensity, placed on an output side of the free-space optical interconnector; and a feedback controller for controlling a driving voltage to obtain a maximum value of the output light intensity at the two-dimensional optical detector array.

According to a third aspect of the present invention, there is provided an optical switch comprising:

a two-dimensional optical gate switch array having a plurality of pixels where each pixel has a light-input portion and a light-modulating portion and output beams are generated by putting readout beams into the light-modulating portion;

a polarization beam splitter;

a λ/4 plate placed between the two-dimensional optical gate switch array and a first surface of the polarization beam splitter; and a liquid crystal microprism array or a free-space optical interconnector placed in close proximity to a second surface facing to the first surface of the polarization beam splitter, wherein a group of input optical beams are inputted into the light-input portion of the two-dimensional gate switch array and passed through a third surface of the polarization beam splitter, the ¼ wavelength plate, the polarization beam splitter, and the liquid crystal microprism array or the free-space optical interconnector in that order to generate output beams.

Here, an optical switch may further comprise:

a second liquid crystal microprism array or a second free-space optical interconnector placed in close proximity to the third surface of the polarization beam splitter, wherein predetermined numbers of readout beams are inputted into the polarization beam splitter through the second liquid crystal microprism array or the second free-space optical interconnector and the predetermined numbers of readout beams are outputted from the polarization beam splitter to converge at one of the pixels of the two-dimensional optical gate switch array.

The liquid crystal microprism array may comprise:

a first transparent substrate;

a transparent electrode divided into a plurality of electrode segments on a first surface of the first transparent substrate;

an alignment layer on a first surface of the first transparent substrate to cover the transparent electrode;

a second transparent substrate having a first surface facing the first surface of the first transparent substrate;

a transparent electrode on a first surface of the second transparent substrate;

an alignment layer on a first surface of the second transparent substrate to cover the transparent electrode;

a power supply for placing a voltage between the transparent electrodes;

a plurality of grooves formed on at least one selected from the first surface of the first transparent substrate and the first surface of the second transparent substrate;

a plurality of spaces divided by ridges of the grooves; and a liquid crystal layer sandwiched by the first and second substrates.

An optical switch may further comprise:

a third liquid crystal microprism array or a third free-space optical beam interconnector are placed between the two-dimensional optical gate switch array and the polarization beam splitter.

The optical switch may be provided as a second stage of multiple-staged optical switches and optically connected with another optical switch formed as a first stage, where predetermined numbers of output beams from the first stage is converged at a point of the first stage.

The optical switch may be provided as a second stage of multiple-staged optical switches and optically connected with another optical switch formed as a first stage having a two-dimensional optical gate switch array for generating a predetermined numbers of output beams which are converged at one of input pixels of the two-dimensional optical gate switch array of the second stage.

An optical switch may further comprise:

a mon53ring system for mon53ring a reflected light from a polarization beam splitter, or a liquid crystal microprism array, or free-space beam interconnector, having a camera.

An optical switch may further comprise:

a cylinder-like holder for co-optical axially mounting the polarization beam splitter, the half mirror, the second liquid crystal microprism array, or any components except the free-space optical beam interconnector; and a substrate having a V-shaped groove for composing a plurality of the holders as a multistage.

According to a fourth aspect of the present invention, there is provided an optical switch comprising:

a two-dimensional optical gate switch array having a plurality of pixels where each pixel has a light-input portion and a light-modulating portion and output beams are generated by putting readout beams into the light-modulating portion;

a half mirror;

a fee-space optical beam interconnector placed at a position facing to the two-dimensional optical gate switch array through the half mirror, wherein a group of input optical beams are inputted into the light-input portion of the two-dimensional gate switch array and passed through the half mirror to en75 into the light-modulating portion of the two-dimensional optical gate switch array, and then output beams are generated through the half mirror and the liquid crystal microprism array or the free-space optical beam interconnector.

Here, an optical switch may further comprise:

a second liquid crystal microprism array or a second free-space optical beam interconnector placed on a readout beam input side of the half mirror, wherein predetermined numbers of readout beams are inputted into the half mirror through the second liquid crystal microprism array or the second free-space optical interconnector and the predetermined numbers of readout beams are outputted from the half mirror to converge at one of the pixels of the two-dimensional optical gate switch array.

The liquid crystal microprism array may comprise:

a first transparent substrate;

a transparent electrode divided into a plurality of electrode segments on a first surface of the first transparent substrate;

an alignment layer on a first surface of the first transparent substrate to cover the transparent electrode;

a second transparent substrate having a first surface facing the first surface of the first transparent substrate;

a transparent electrode on a first surface of the second transparent substrate;

an alignment layer on a first surface of the second transparent substrate to cover the transparent electrode;

a power supply for placing a voltage between the transparent electrodes;

a plurality of grooves formed on at least one selected from the first surface of the first transparent substrate and the first surface of the second transparent substrate;

a plurality of spaces divided by ridges of the grooves; and a liquid crystal layer sandwiched by the first and second substrates.

An optical switch may further comprise:

a third liquid crystal microprism array or a third free-space optical beam interconnector are placed between the two-dimensional optical gate switch array and the polarization beam splitter.

The optical switch may be provided as a second stage of multiple-staged optical switches and optically connected with another optical switch formed as a first stage, wherein predetermined numbers of output beams from the first stage is converged at a point of the first stage.

The optical switch may be provided as a second stage of multiple-staged optical switches and optically connected with another optical switch formed as a first stage having a two-dimensional optical gate switch array for generating a predetermined numbers of output beams which are converged at one of input pixels of the two-dimensional optical gate switch array of the second stage.

An optical switch may further comprise:

a mon53ring system for monitoring a refracted light from a polarization beam splitter, a half mirror, or a liquid crystal microprism array, or free-space beam interconnector, having a camera.

An optical switch may further comprise:

a cylinder-like holder for co-optical axially mounting the polarization beam splitter, the half mirror, the second liquid crystal microprism array, or any components except the free-space optical beam interconnector; and a substrate having a V-shaped groove for composing a plurality of the holders as a multistage.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Figure 1:
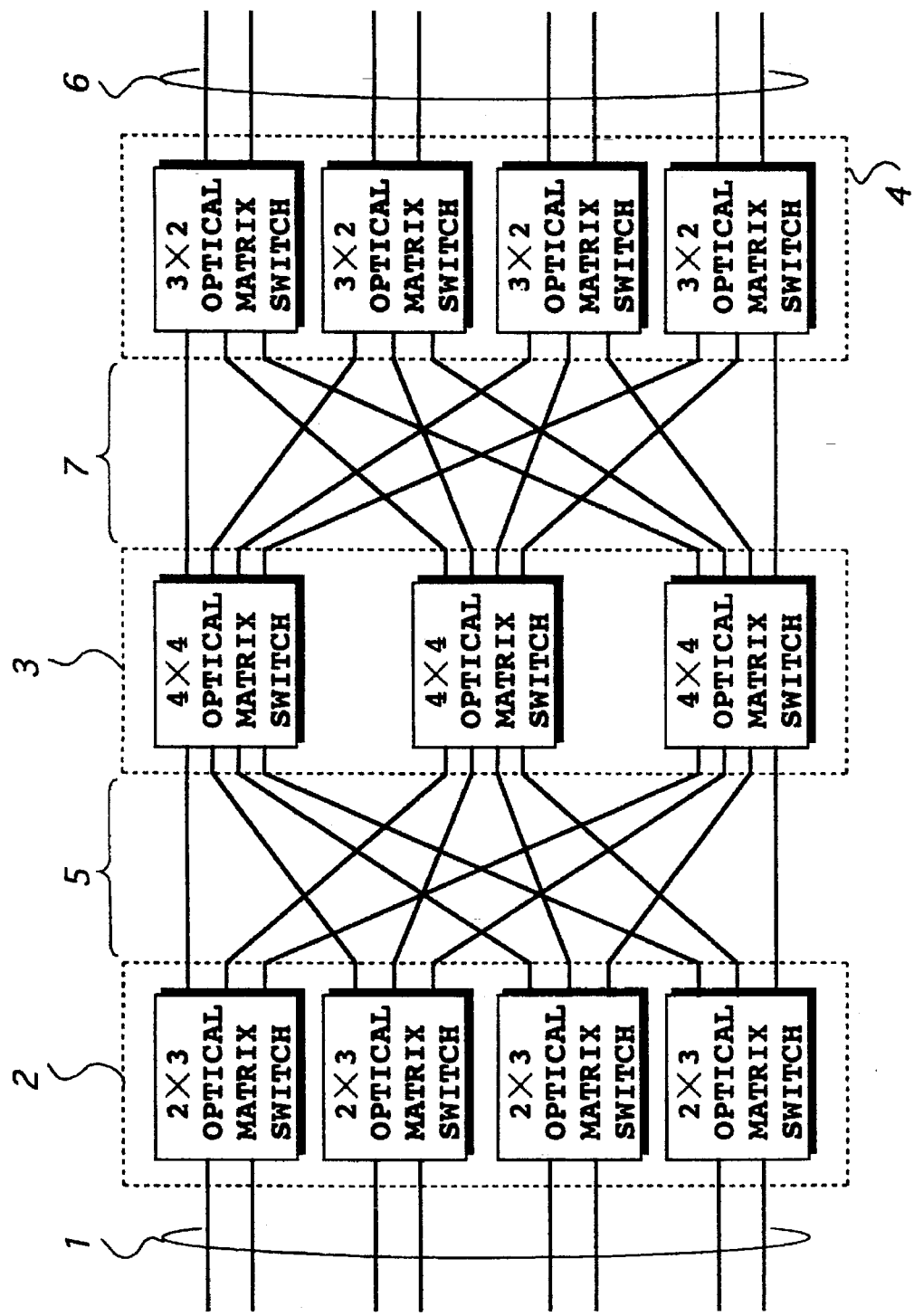
FIG. 1 is a plan view of a conventional 8×8 parallel optical switch.
Figure 2:
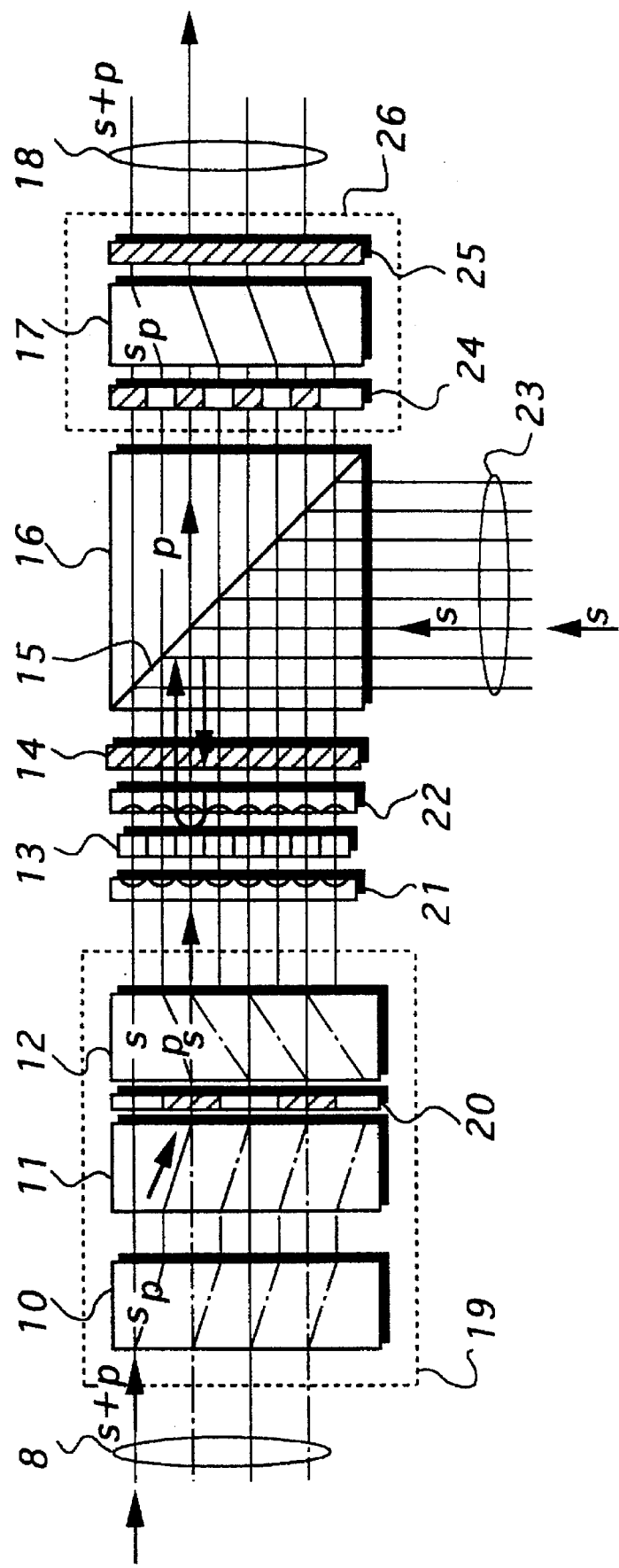
FIG. 2 is a plan view of a conventional optical switch as a combination of arrays of two-dimensional optical elements with free-space optical interconnections.
Figure 3:
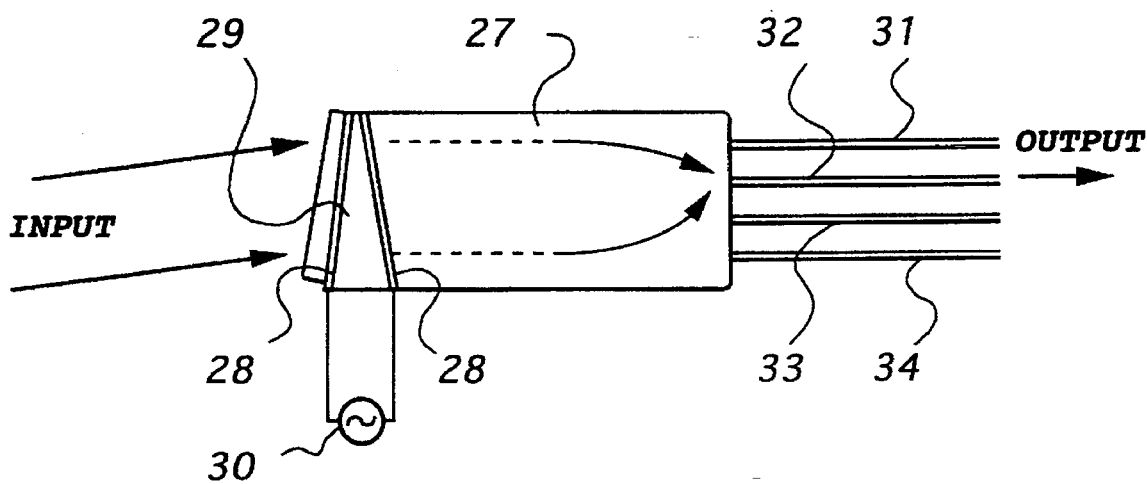
FIG. 3 is a plan view of a conventional optical switch with a free-space optical interconnection in which optical elements are adjustably connected with each other.
Figure 4:
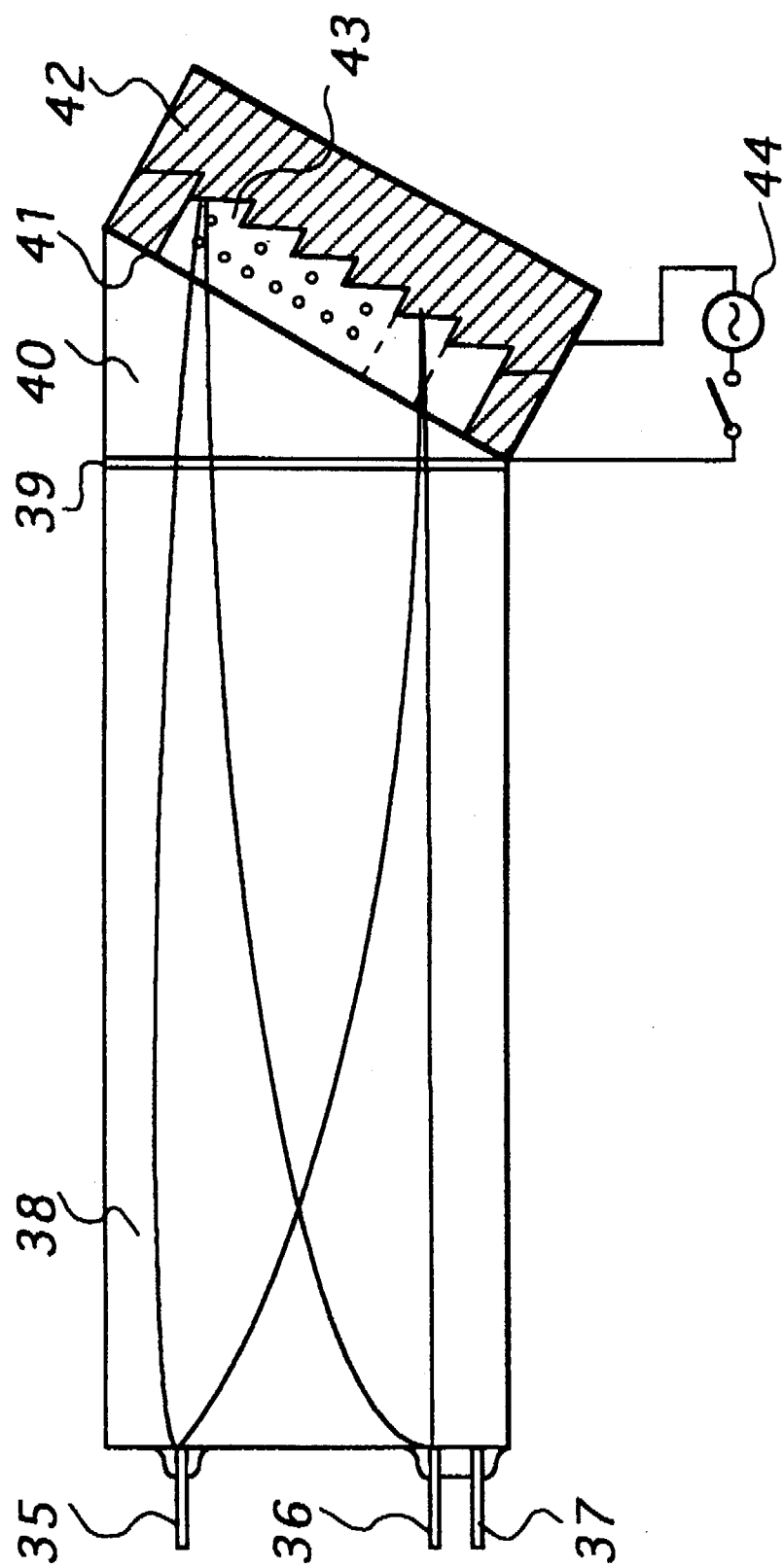
FIG. 4 is a plan view of a conventional optical switch.

Throughout the following detailed description, similar reference numeral refer to similar elements in all figures of the drawings.

The present invention is not to be interpreted in a limiting sense, and may be adapted to various embodiments and modification satisfying the purpose of the invention.

EXAMPLE 1

Figure 5:
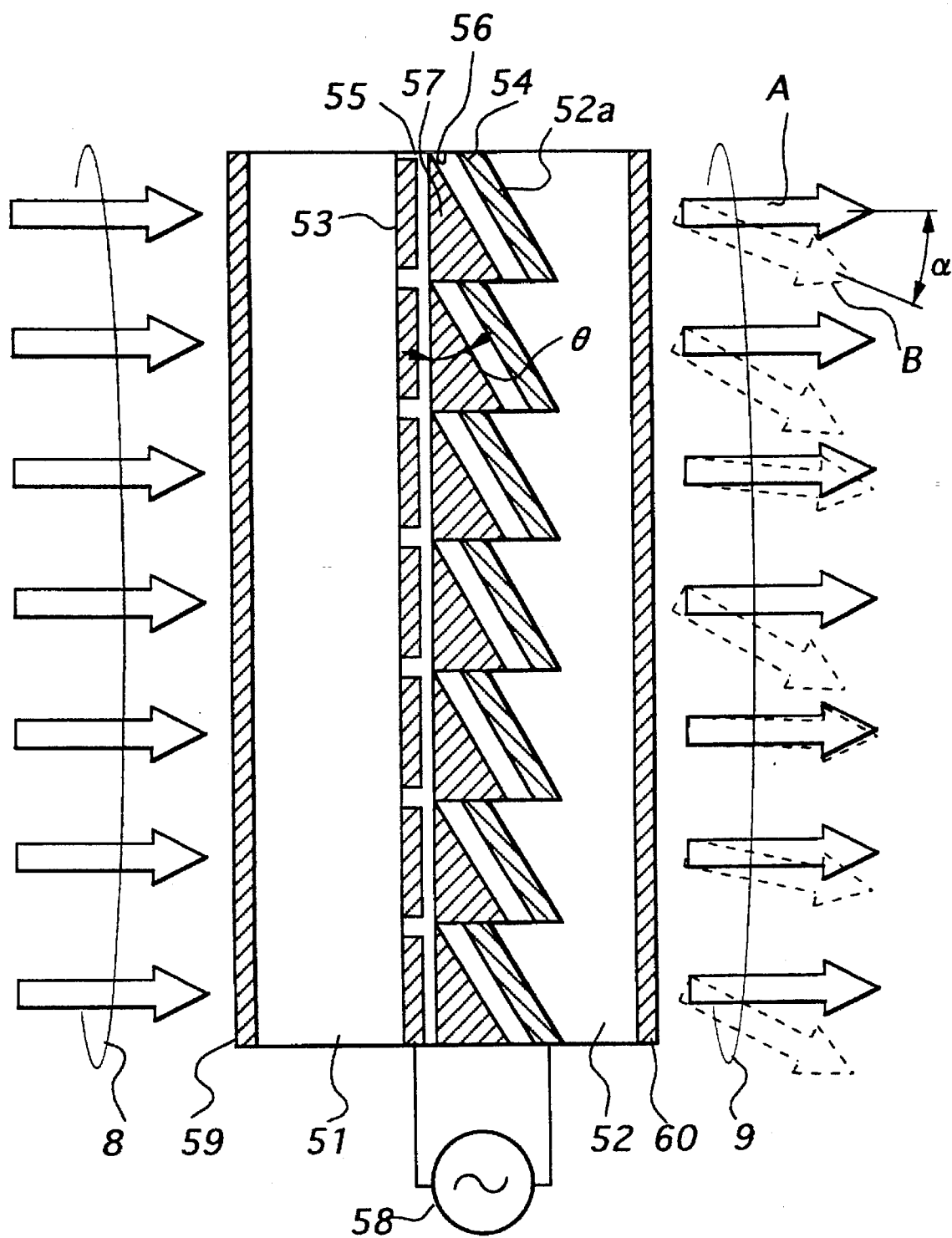
FIG. 5 is a sectional view of a liquid crystal microprism array in accordance with the present invention.

Referring now to the attached drawings for a more complete understanding of the invention, FIG. 5 shows an optical switch having a liquid crystal microprism array as one of the preferred embodiments in accordance with the present invention.

The optical switch comprises a first anti-reflection coat 59; a first optically transparent substrate 51; a first transparent electrode 53; a first alignment layer 55; a liquid crystal cell 57; a second alignment layer 56; a second transparent electrode 54; a second optically transparent substrate 52; and a second anti-reflection coat 60, which are arranged in that order so as form a cascade connection.

The optically transparent substrate 52 has a plurality of grooves on one side thereof adjoining the liquid crystal cell 57 through the alignment layer 56. In this example, the grooves are shaped like toothed edges of a saw in cross section. Also, each groove is shaped as a right-angled triangle in cross section, so that the groove has an inclined inner wall and a vertical inner wall. In this example, as shown in the figure, a plurality of grooves 52a are formed on one side of the transparent substrate 52 but not limited to this construction. It is possible to form these grooves on another side of the transparent substrate or both sides of them.

The transparent electrodes 53, 54 are connected with a power supply 58 and arranged so as to have a pattern of parallel stripes to match with a pitch of the grooves 52a. It is noted that every stripe of transparent electrodes receives its own appropriate voltage by means of variable resistor (not shown). Furthermore, it is also possible to form the transparent electrodes 53, 54 as a plurality of separated dot-like electrode fragments for adjusting individually the course of each incident beam. In addition, thin-layer transistors (TFT) corresponding to respective electrode fragments can be formed on a surface of the transparent substrate having these fragments.

The liquid crystal cell 57 is made of liquid-crystal molecules which are aligned homogeneously in the direction parallel to a ridge of the groove 52a. Each liquid crystal cell 57 is shaped like a right-triangle in cross section. It is possible to make a connection between the cells to an extent of without causing a bad influence on each other. On both sides of the liquid crystal cell 57, the alignment layer 55, 56 and transparent electrodes 53, 54 are arranged to form a construction unit which is referred to as a liquid crystal microprism. As shown in the figure, a plurality of the construction units is arranged in a row to form a liquid crystal microprism array.

Incident light-beams are provided into the respective liquid crystal microprisms through the transparent substrate 51. Then the light-beams travel into a bottom of the respective groove 52a of the transparent substrate 52. When the voltage is applied across the cell, the liquid-crystal molecules changes their alignments so as to align homogeneously in the direction perpendicular to a surface of the transparent substrate 51. Thus the refractive index of the liquid crystal cell is changed and the beam is refracted on a surface of the crystal cell at a different refractive angle, resulting in that the beam is propagated in a different direction.

The liquid crystal cell 57 is a wedge-shaped one having an apical angle θ. If the apical angle θ is small, for example in the range of 0° to 30°, the prism deviates the light-beam through the angle which is referred as a refractive angle α between the course of the input beam and the course of the output beam. The refractive angle α is given by:

$$\alpha = (n-1)\theta$$

wherein "n" means the refractive index of the required crystal cell 57.

The refractive index of each liquid crystal cell is depended on a plane of polarization of the input beam. The refractive index n takes a constant value $n_0$ in accordance with the voltage between the two electrodes with respect to the polarization which is perpendicular to the orientation of the liquid crystal molecules. On the other hand, the refractive index n varies in accordance with the voltage between the two electrodes with respect to the polarization parallel to the orientation of the liquid crystal molecules. In the case that the liquid crystal molecules are homogeneously arranged, for example, the value n takes from $n_e$ to $n_0$ (i.e., $\Delta n=n_e-n_0$). In general, the difference $\Delta n$ takes a value almost in the range of 0.2 to 0.3, so that the direction of deflecting the output beam can be changed from one direction indicated by an arrow A to another direction indicated by an arrow B at a deflection angle $\alpha$ of about $0.3\times\theta$.

Figure 6:
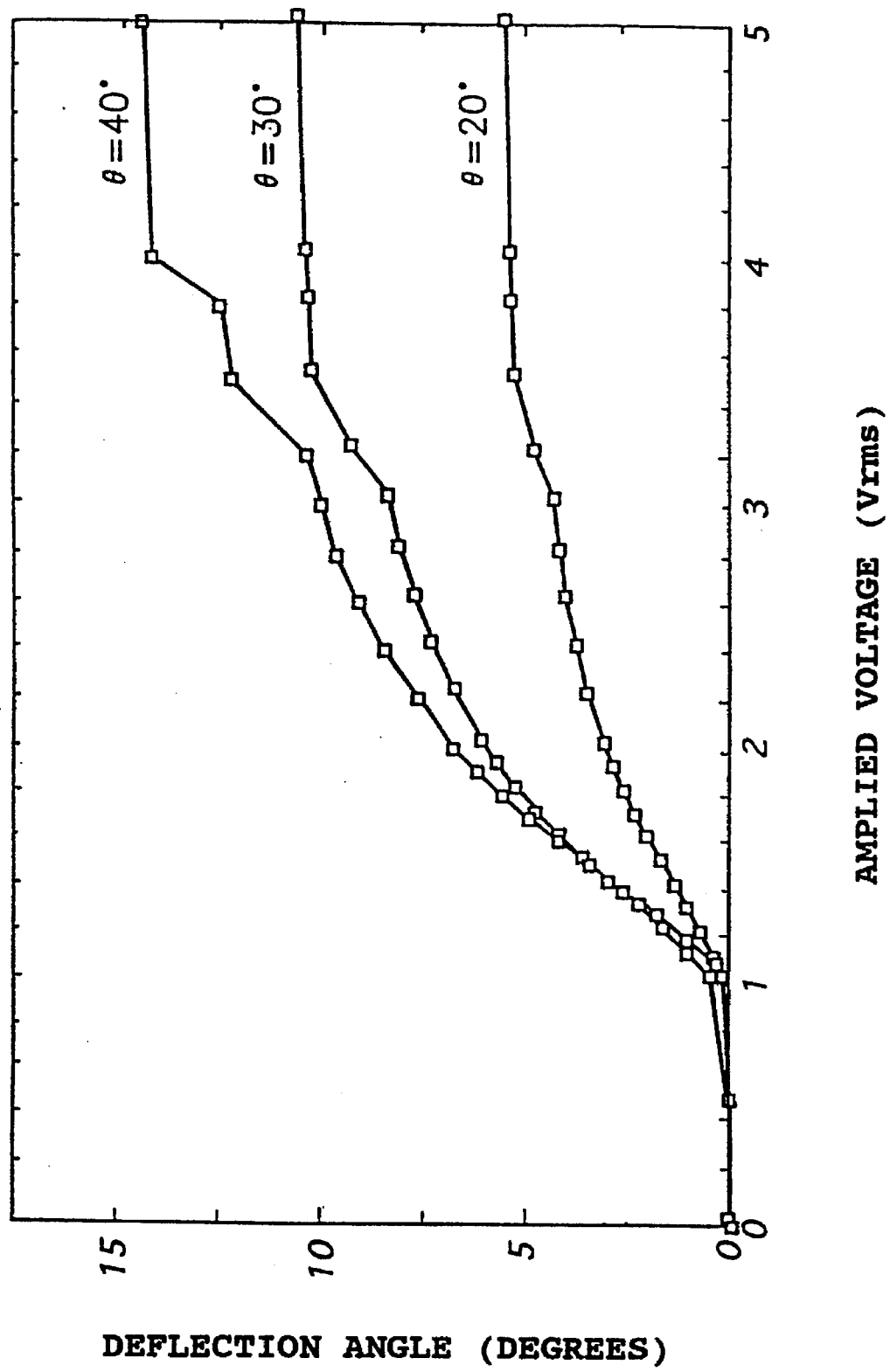
FIG. 6 is a graphical representation of a relation between the deflection angle α of the light-beam and the applied voltage V on the liquid crystal cell having an apical angle θ of 20°, 30°, or 40°.

FIG. 6 shows the relation between the deflection angle $\alpha$ of the light-beam and the applied voltage V on the liquid crystal cell having an apical angle $\theta$ of 20°, 30°, or 40°. As shown in the figure, the light-beam can be deflected at an angle of about 15° by using the cell of $\theta=40°$.

EXAMPLE 2

Figure 7:
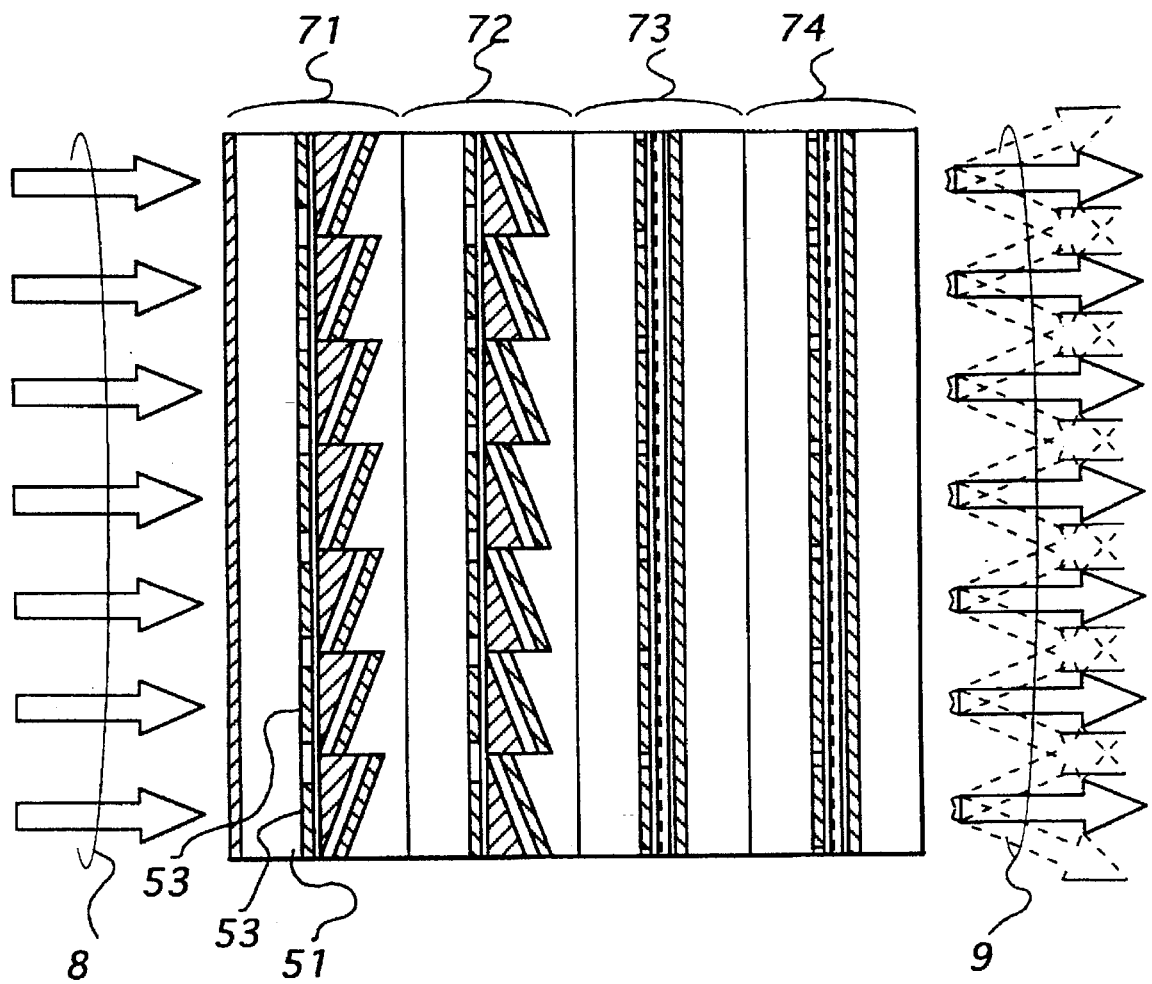
FIG. 7 is a sectional view of the free-space interconnector in accordance with the present invention.

FIG. 7 shows a free-space optical interconnector as a second preferred embodiment of the present invention.

The free-space optical interconnector comprises four liquid crystal microprism arrays 71, 72, 73, and 74 which are placed one behind the other in that order so as to be arranged as a series of components in a cascade direction. These arrays have the same construction as that of the first preferred embodiment. The second, third, and forth arrays 72, 73, and 74 are positioned so as to face toward the direction rotated from that of the first one at angles of 0°, 180°, 90°, and 270° around their longitudinal axes, respectively. In these arrays, furthermore, the liquid-crystal molecules are aligned homogeneously in the direction corresponding to a direction of polarizing the input light-beams 8.

Figure 8:
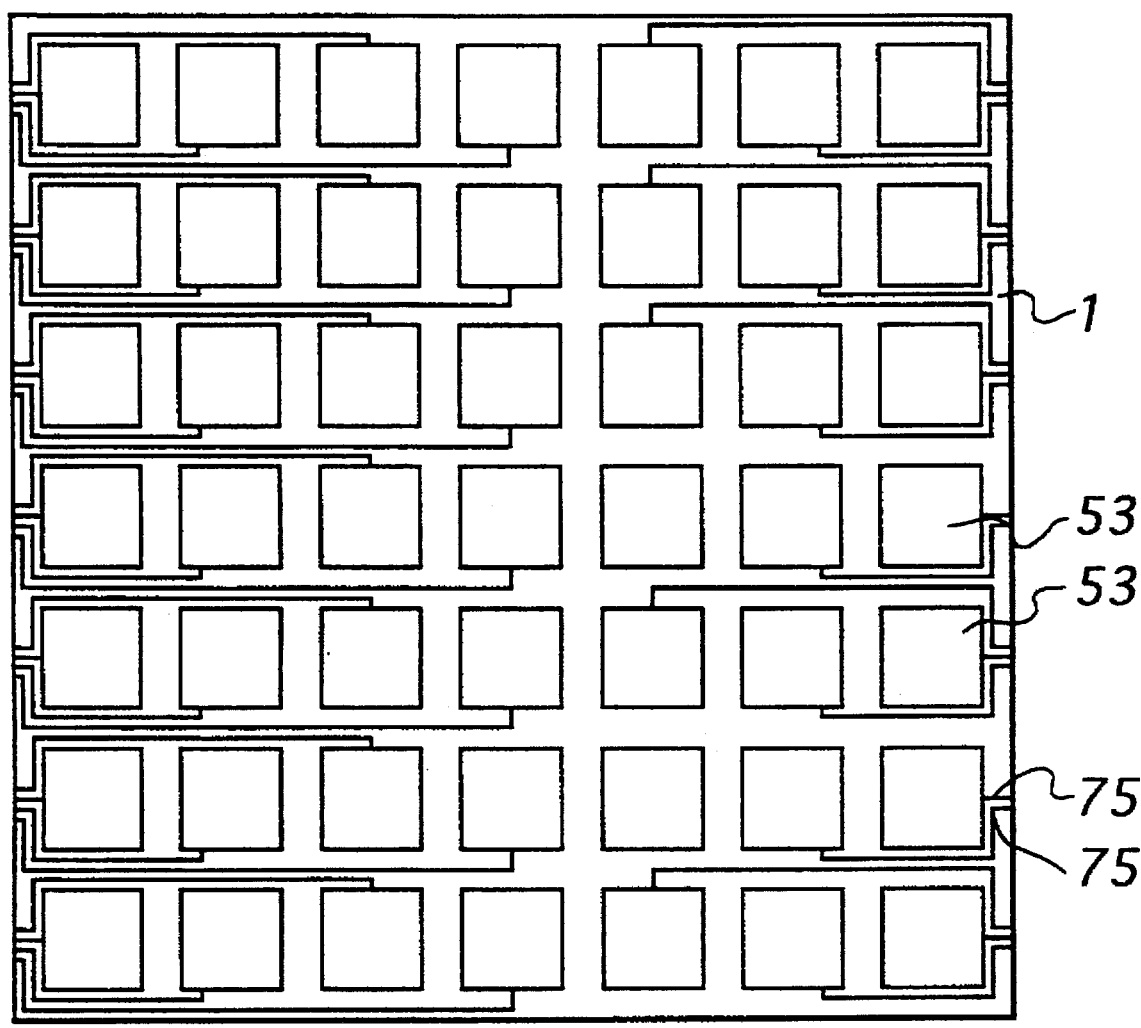
FIG. 8 is a plan view of an arrangement of transeperent electrodes of the liquid crystal microprism array.

FIG. 8 shows an arrangement of transparent electrodes 53 and electric terminals 75 both formed on the flat transparent substrate 51 in the liquid crystal microprism arrays 71–74.

Each transparent electrode 53 is formed as a pixel-like plate corresponding to each input light-beam and connected with a voltage controller (not shown) through the terminal 75. Therefore the transparent electrodes 53 can be applied different voltages respectively by the controller, resulting that the direction of propagating each light-beam can be changed in a vertical or horizontal direction.

EXAMPLE 3

Figure 9:
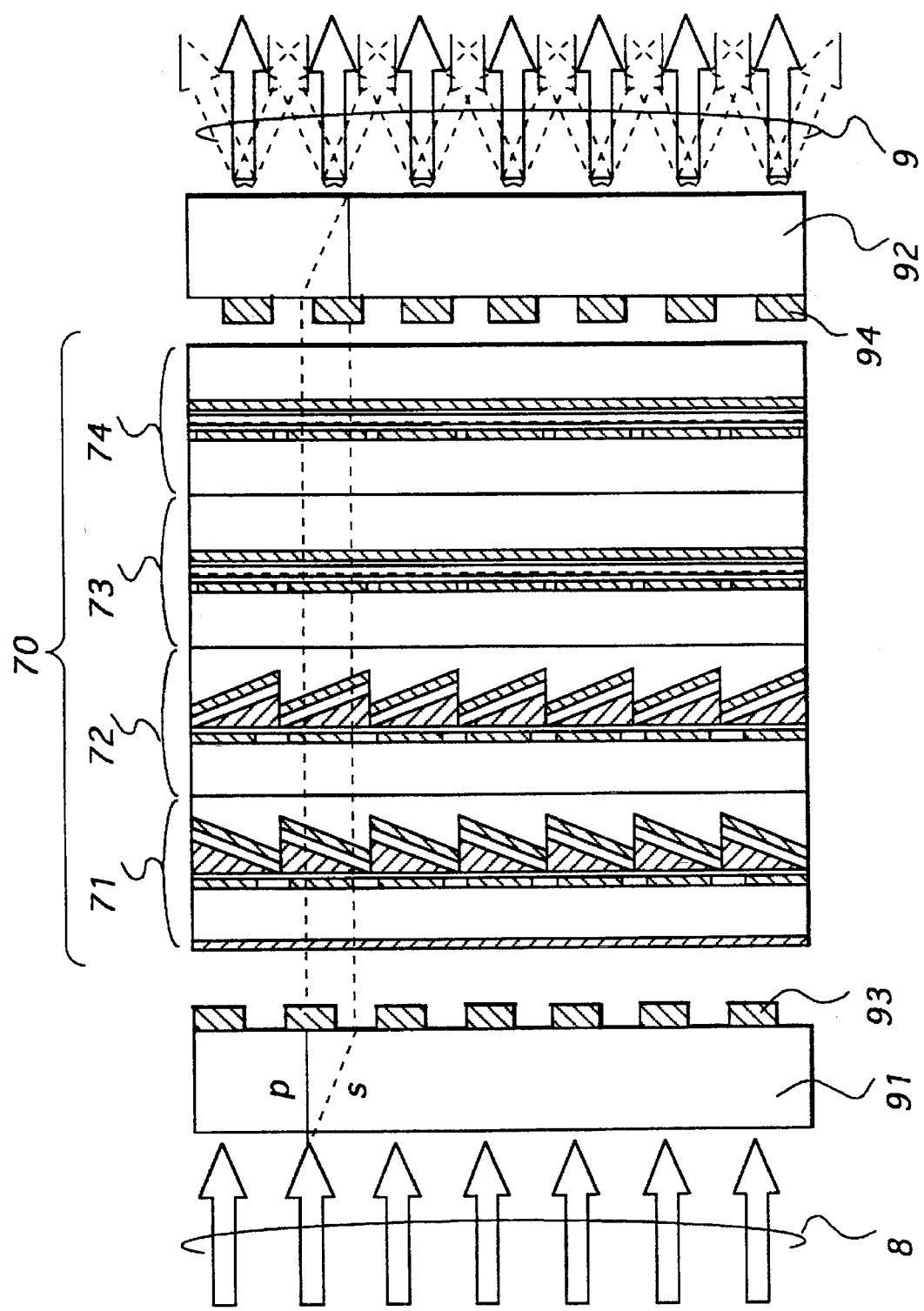
FIG. 9 is a sectional view of the free-space interconnector in accordance with the present invention.

FIG. 9 shows another free-space optical interconnector as a third preferred embodiment of the present invention.

In this example, birefringent plates (such as a carsite) 91, 92 are placed on both sides of the interconnector 70 of the second preferred embodiment. As shown in the figure, each birefringent plate has a plurality of $\lambda/2$ plates 93, 94 on its side facing to the arrays. In this case, each $\lambda/2$ plate 93 is placed on the position corresponding to the course of p-polarized beam while each $\lambda/2$ plates 94 is placed on the position corresponding to the course of s-polarized beam.

The incident light-beams 8 are divided into p- and s-polarized beam groups at a surface of the birefringent plate 91. The p-polarized beam propagates without deviation and passes through the $\lambda/2$ plate 93, while the s-polarized beam deviates from the course of propagating the input light-beam and does not pass through the $\lambda/2$ plate 93. The $\lambda/2$ plate 93 converts the p-polarized beam into s-polarized beam by turning a polarized plane of the p-polarized beam. The s-polarized beam is coincident with the orientation of liquid crystal molecules. Then the two divided beams propagate into a series of the liquid crystal microprism arrays where the beams are deflected vertically or horizontally. After passing through these arrays 71–74, the polarized beams are coupled together by passing through the $\lambda/2$ plate 94 and the birefringent plate 92 to output the resulting beam 9.

As described above, any input beam 8 can be converted into the polarized beam coinciding with the orientation of the liquid crystal molecules of the liquid crystal microprism arrays by passing through the birefringent plates and the $\lambda/2$ plates 93, 94. Consequently, there is no need to use specifically polarized beams as the input beams and also there is no need to arrange the polarization of the input beam in the direction of aligning the liquid crystal molecules.

EXAMPLE 4

Figure 10:
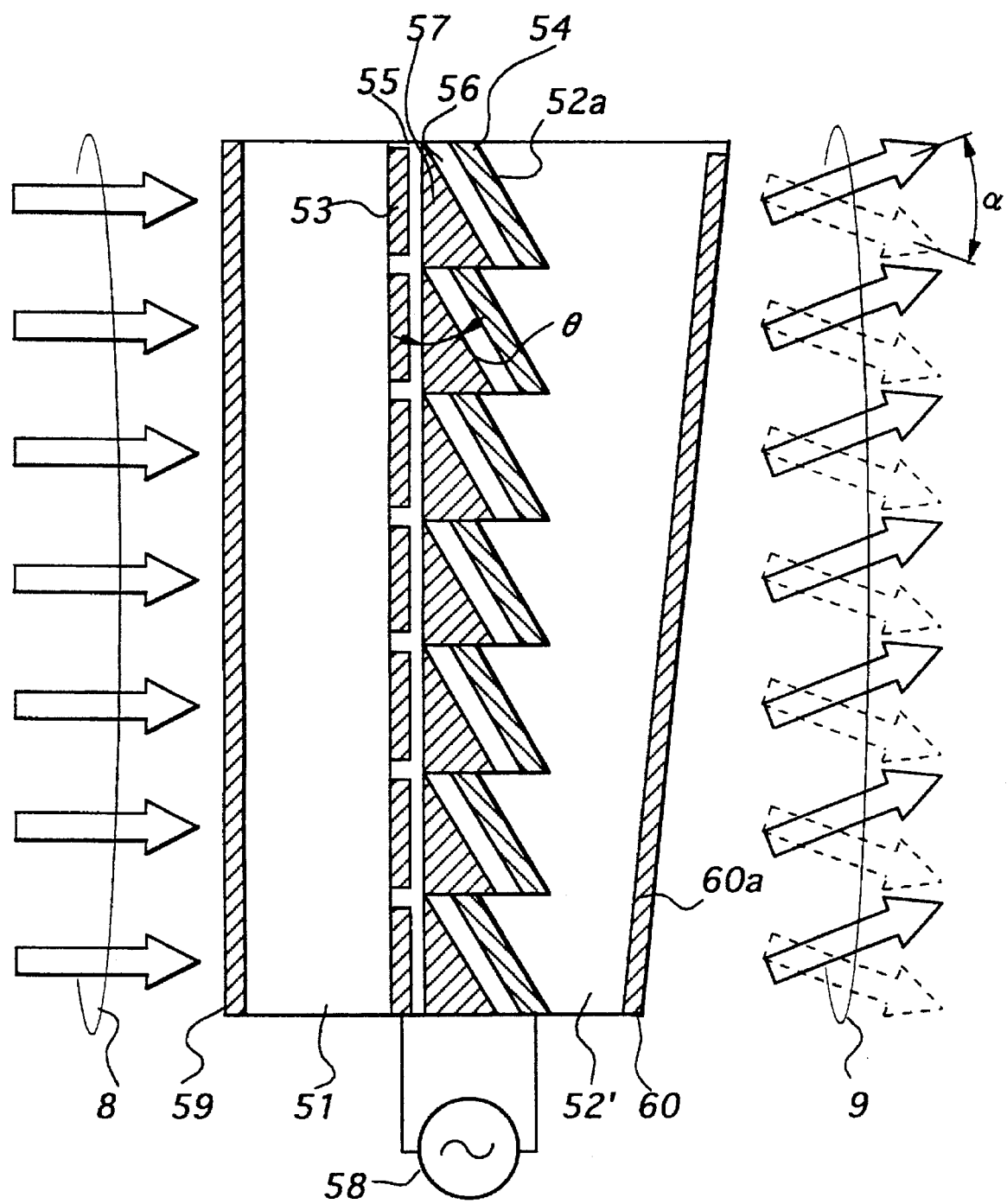
FIG. 10 is a sectional view of the liquid crystal microprism array in accordance with the present invention.

FIG. 10 shows a liquid crystal microprism array as one of the preferred embodiments in accordance with the present invention.

The liquid crystal microprism array of the example 4 has the same construction as that of the example 1 except that a thickness of the transparent plate 52' is gradually reduced to form an inclined flat surface 60a. Therefore, the light-beam can be not only deflected downward but also deflected upward in the figure. In the present circumstances, it is possible to change the deflection angle in the range of −7° to +7° by adjusting an apical angle $\theta$ of the liquid crystal at 40°.

Figure 11:
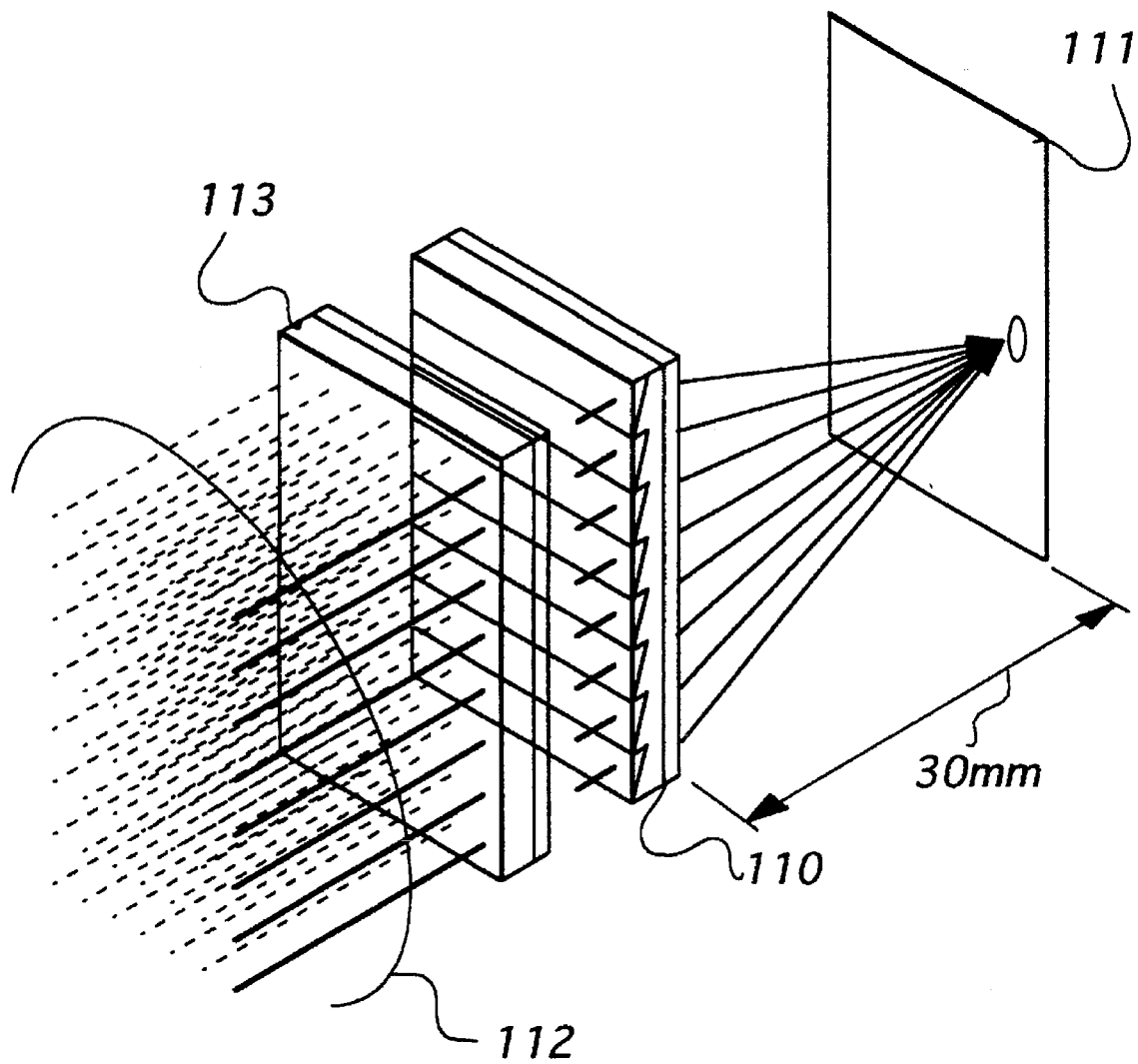
FIG. 11 is a perspective view of the liquid crystal microprism array in accordance with the present invention.
Figure 12:
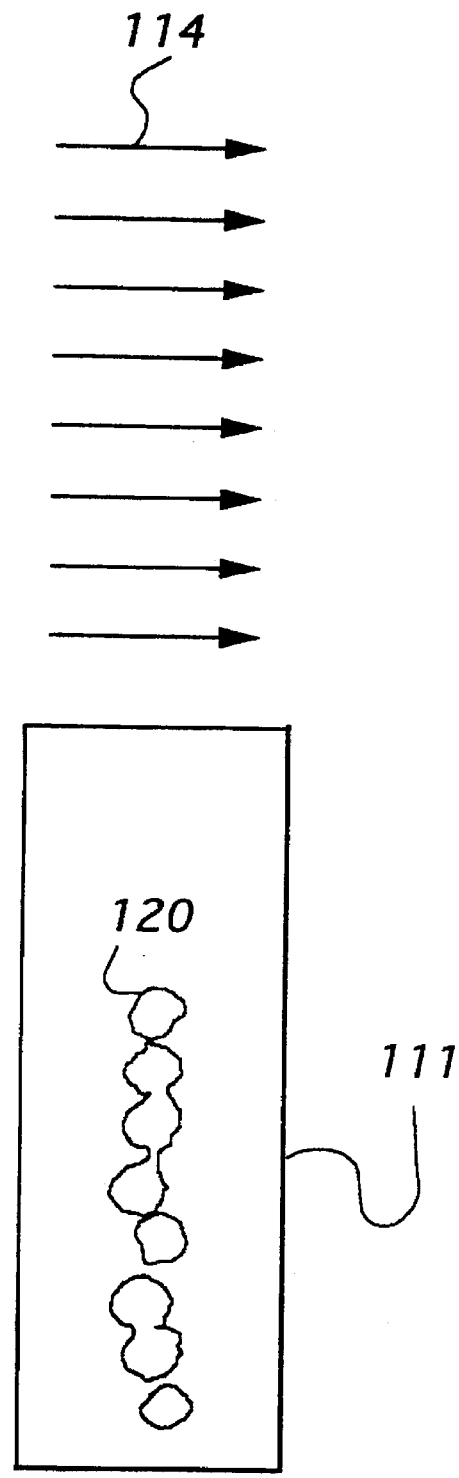
FIG. 12 is a plan view of parallel beams striked on a plane of the CCD image sensor in accordance with the present invention.
Figure 13:
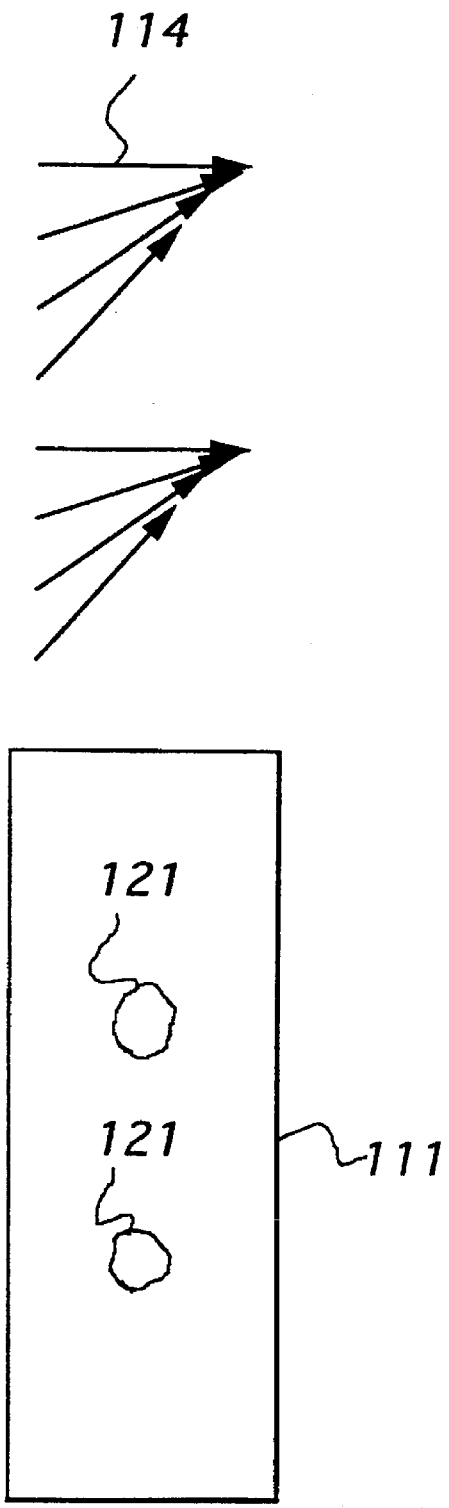
FIG. 13 is a plan view of light-beams converged on two points of a plane of the CCD image sensor in accordance with the present invention.
Figure 14:
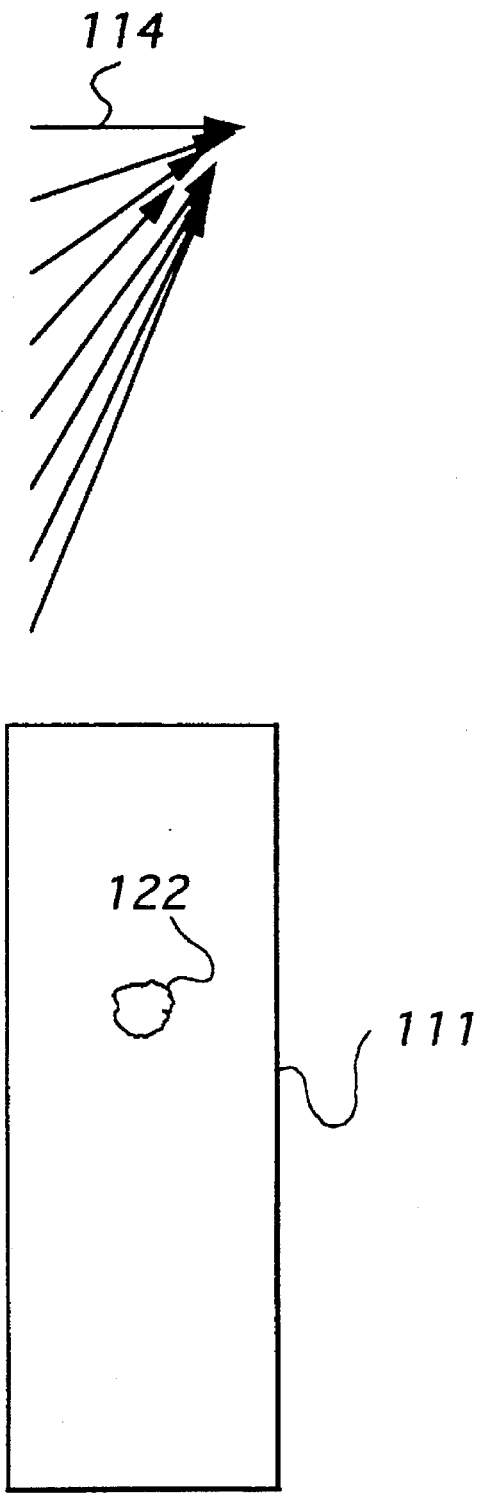
FIG. 14 is a plan view of light-beams converged on one point of a plane of the CCD image sensor in accordance with the present invention.

The liquid crystal microprism array causes a plurality of parallel beams to converge on a predetermined point with ease. For example, FIG. 11 shows that eight beams 112 with 250 μm pitch are focused on a plane of CCD image sensor 111 by a liquid crystal microprism array 110 after passing through a micro-lens array 113. FIGS. 12–14 are simple diagrams for indicating the spots formed on the plane by the output beams 114. In FIG. 12, the light-beams pass paralley through the arrays and form six spots 120 corresponding to the beams. In FIG. 13 the output beams come together from different directions to form two spots 121, while in FIG. 14 the output beams are converged into one spot 122.

Therefore, a large scaled optical switches (e.g., N×1, 1×N, and N×N optical switches) can be constructed through the use of advantages of the liquid crystal microprism arrays described above.

EXAMPLE 5

Figure 15:
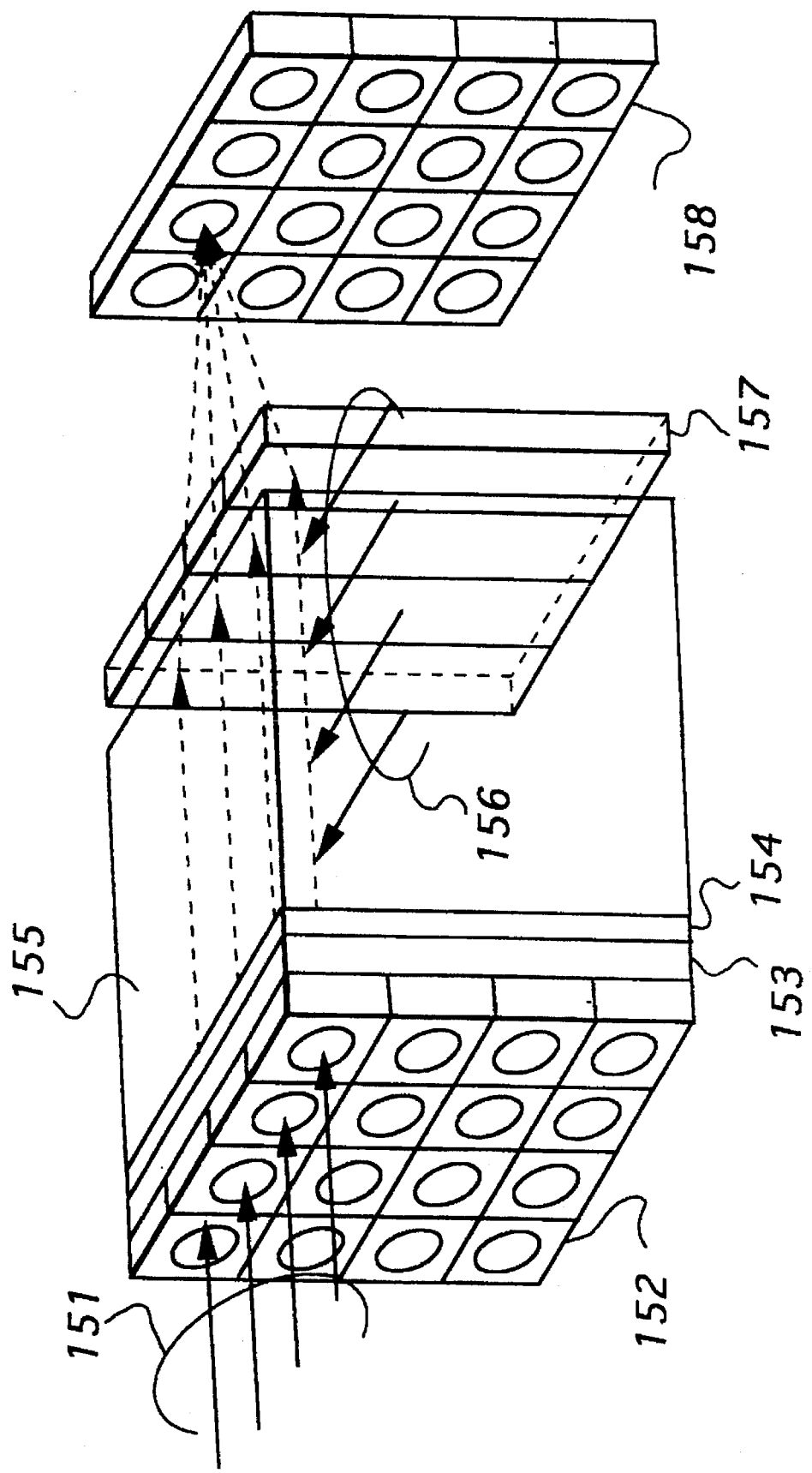
FIG. 15 is a perspective view of an N×1 optical switch in accordance with the present invention.
Figure 16:
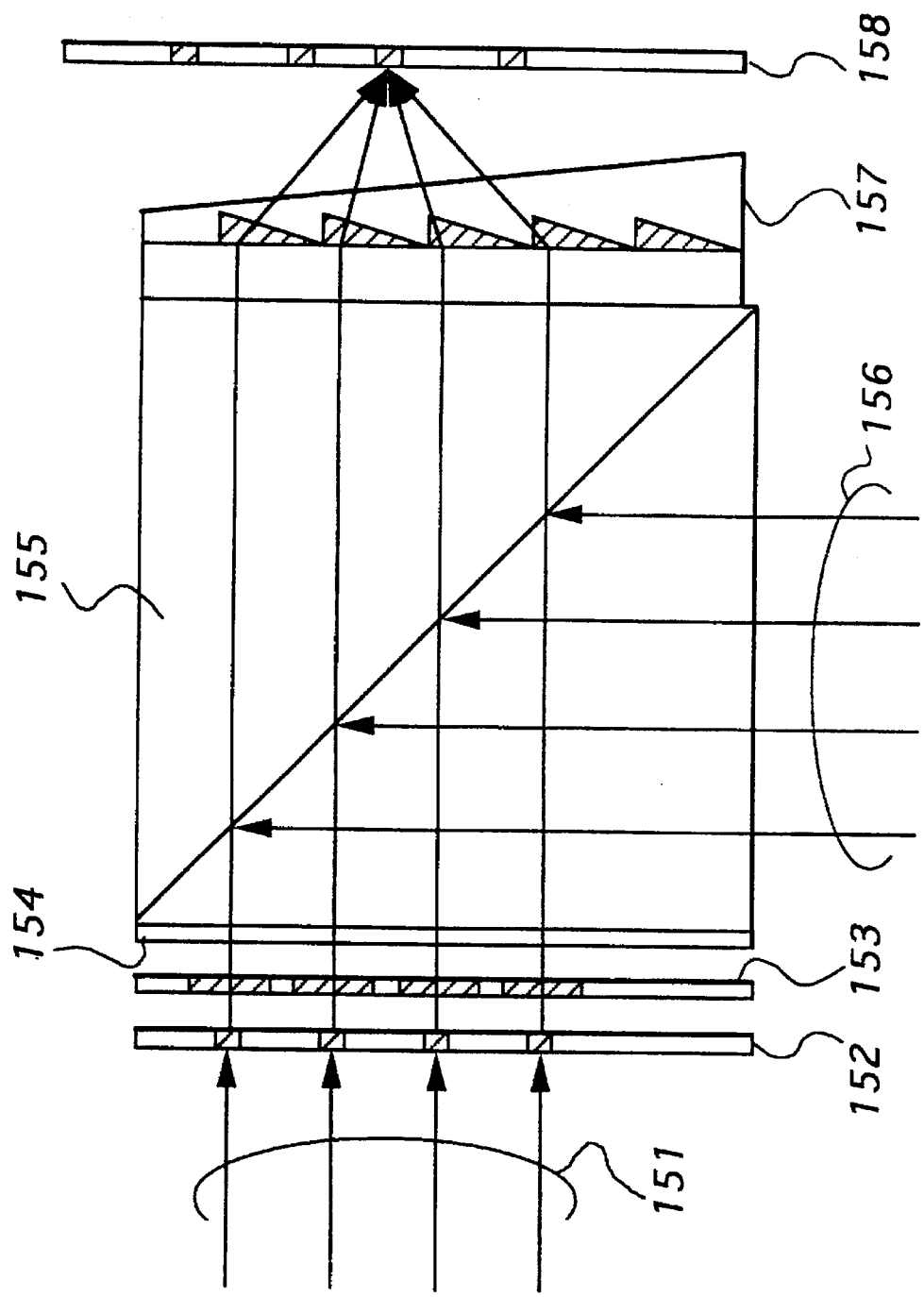
FIG. 16 is a plan view of the N×1 optical switch in accordance with the present invention.

FIGS. 15 and 16 show an N×1 optical switch as a fifth preferred embodiment of the present invention.

The N×1 optical switch comprises a non-emitting two-dimensional optical gate switch array 152, a micro-lens array 153, a $\lambda/4$ plate 154, a polarization beam splitter 155, and a liquid crystal microprism array 157, which are arranged in that order so as to form as a cascade connection.

To take a simple example, the followings are explanation of a 4×1 optical switch as an upper part of the 4×4 one. As shown in the figure, four parallel beams 151 are introduced into a light-receiving side of the two-dimensional gate switch array 152 while four parallel rays of readout light 156 are provided from a light modulation side of the two-dimensional get switch array 152. The incoming readout beams are reflected by the array 152 and focused on a point of one of pixels formed on a light-receiving side of an adjacent two-dimensional optical gate switch array 158 through the liquid crystal microprism array 157.

In general, optical lenses may be used for converging rays of light at a point but actuarially the conventional lenses cannot converge them precisely at the point because of their aberrations in which the incident light-beams deviate from the proper or expected course. According to the present example, on the other hand, the rays of light can be converged at a point by selecting one beam from the four readout beams to construct the 4×1 optical switch.

There are several ways for selecting one from the readout beams. In the case of using surface emitting laser (SEL) array, for example, the readout beam can be selected by applying a flow of electric charge on an appropriate emitting pixel. In the case of using the typical semiconductor laser array, the readout beam can be also selected by applying a flow of electric charge on an appropriate laser. Furthermore, a combination of the CW light-beam array and the high speed two-dimensional modulator (e.g., the MQW modulator) can be useful for the above selection.

In the present example, the 4×1 optical switch is constructed by the rays of light on the same plane. However it is also possible to form a 8×1 optical switch by piling two 4×1 optical switches one on top of the other. In addition, when the liquid crystal microprism array of the fourth preferred embodiment is used as one for the present example, the incident beam can be deflected at an angle of ±7°. Consequently, in the case of the two-dimensional optical gate switch array comprising a plurality of the semiconductor optical gate switches being arranged so as to separate from each other at the distance of 250 μm between two corresponding switches, or in the case of forming N×1 optical switching on the same horizontal plane, an optical switch in the type of a maximum arrangement of 30×1 can be obtained. In the case of forming N×1 optical switch by using groups of the incident light-beams on the different horizontal planes, furthermore, an optical switch in the type of a maximum arrangement of 900×1 can be obtained.

EXAMPLE 6

Figure 17:
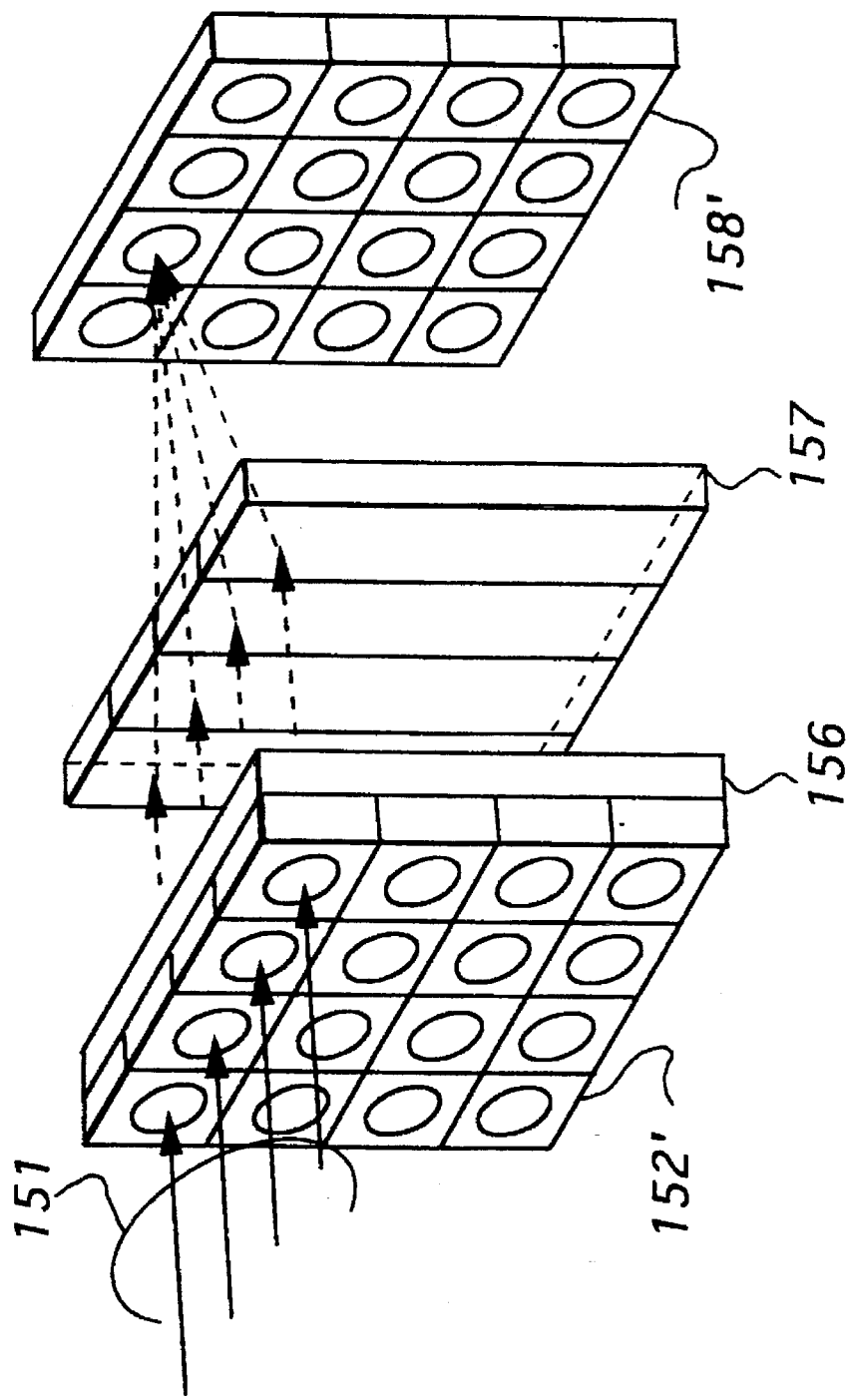
FIG. 17 is a perspective view of an N×1 optical switch in accordance with the present invention.

FIG. 17 shows another N×1 optical switch as a sixth preferred embodiment of the present invention.

The N×1 optical switch has the same construction as that of the fifth preferred embodiment except that two-dimensional optical gate switch arrays are in the type of emitting light (152', 158'). Therefore, the N×1 optical switch of the present example does not require the readout beams, the polarization beam splitter, and the like.

EXAMPLE 7

Figure 18:
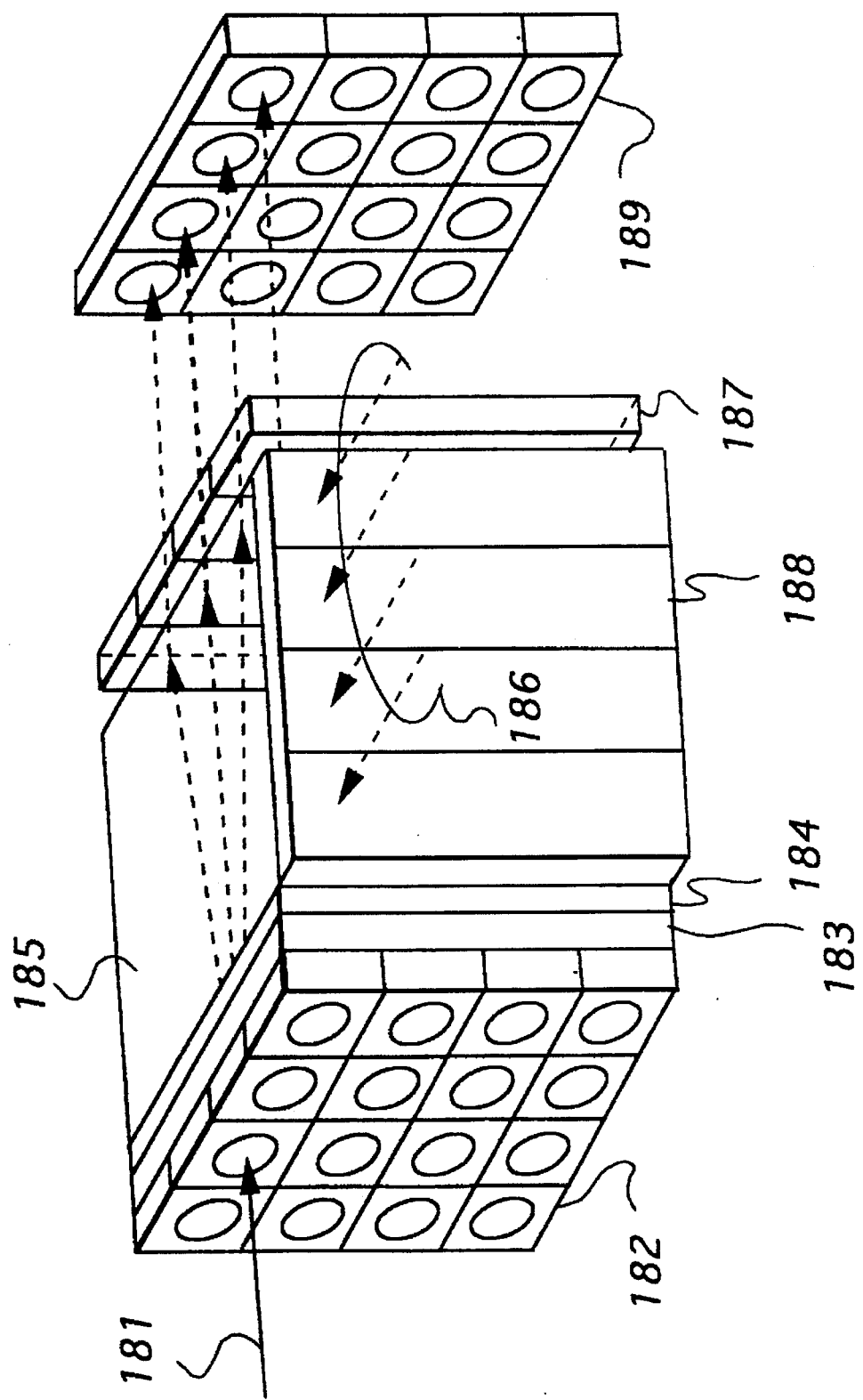
FIG. 18 is a perspective view of a 1×N optical switch in accordance with the present invention.
Figure 19:
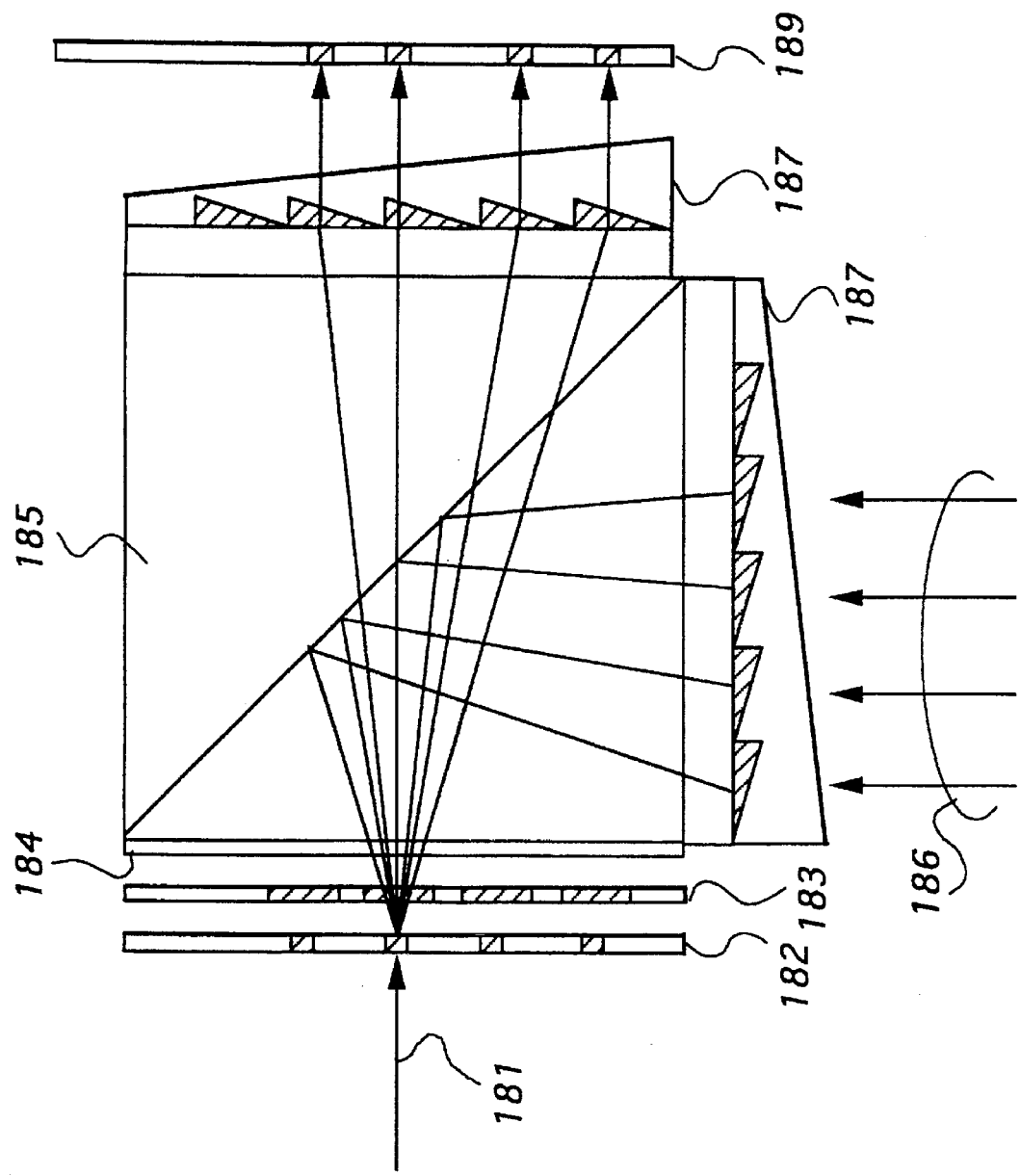
FIG. 19 is a plan view of the 1×N optical switch in accordance with the present invention.

FIGS. 18 and 19 show a 1×N optical switch as a seventh preferred embodiment of the present invention. The 1×N optical switch has the same structure as that of Example 5 or 6 except that a liquid crystal microprism array 188 is arranged between the readout beams 186 and the polarization beam splitter 185.

The 1×N optical switch comprises a first non-emitting two-dimensional optical gate switch array 182, a micro-lens array 183, and a λ/4 plate 184, a polarization beam splitter 185, which are arranged in that order so as to form as a cascade connection. As shown in the figure, a group of beams enters from a light-receiving side of the two-dimensional gate switch array 182 while four parallel rays of readout light enters from a light modulation side of the two-dimensional get switch array 182 by passing through the liquid crystal microprism array 188.

The incoming readout beams 186 are focused on a point of a pixel at a readout side of the two-dimensional optical gate switch array 182 on which the beams are reflected. Then the reflected beams travel toward the liquid crystal microprism array 187 where the beams are deflected to propagate in different directions. After passing through the microprism array 187, each beam enters into a corresponding pixel of a light-receiving side of an adjacent two-dimensional gate switch array 189.

In this example, four readout beams 186 are used. Therefore, it is possible to make a choice among the four readout beams. If all the beams are selected, they act as a broadcast splitter. In this case, however, it does not depend on the number N of the input terminals and it preserves all of the beams without losing at least one of them because of regenerating the light-beam.

In this example, the optical switch that has one input terminal and four output terminals (i.e., 1×4 optical switch) is disclosed. However, it is possible to make a high-capacity optical switch by accumulating a plurality of the 1×4 optical switches to form a multistage construction as in the case of the N×1 optical switch. For example, a 1×30 optical switch can be obtained by parallelly arranging the 1×4 optical switches as units in the horizontal direction, while the a 1×1000 can be obtained by paralley arranging the 1×4 optical switches in the vertical direction.

EXAMPLE 8

Figure 20:
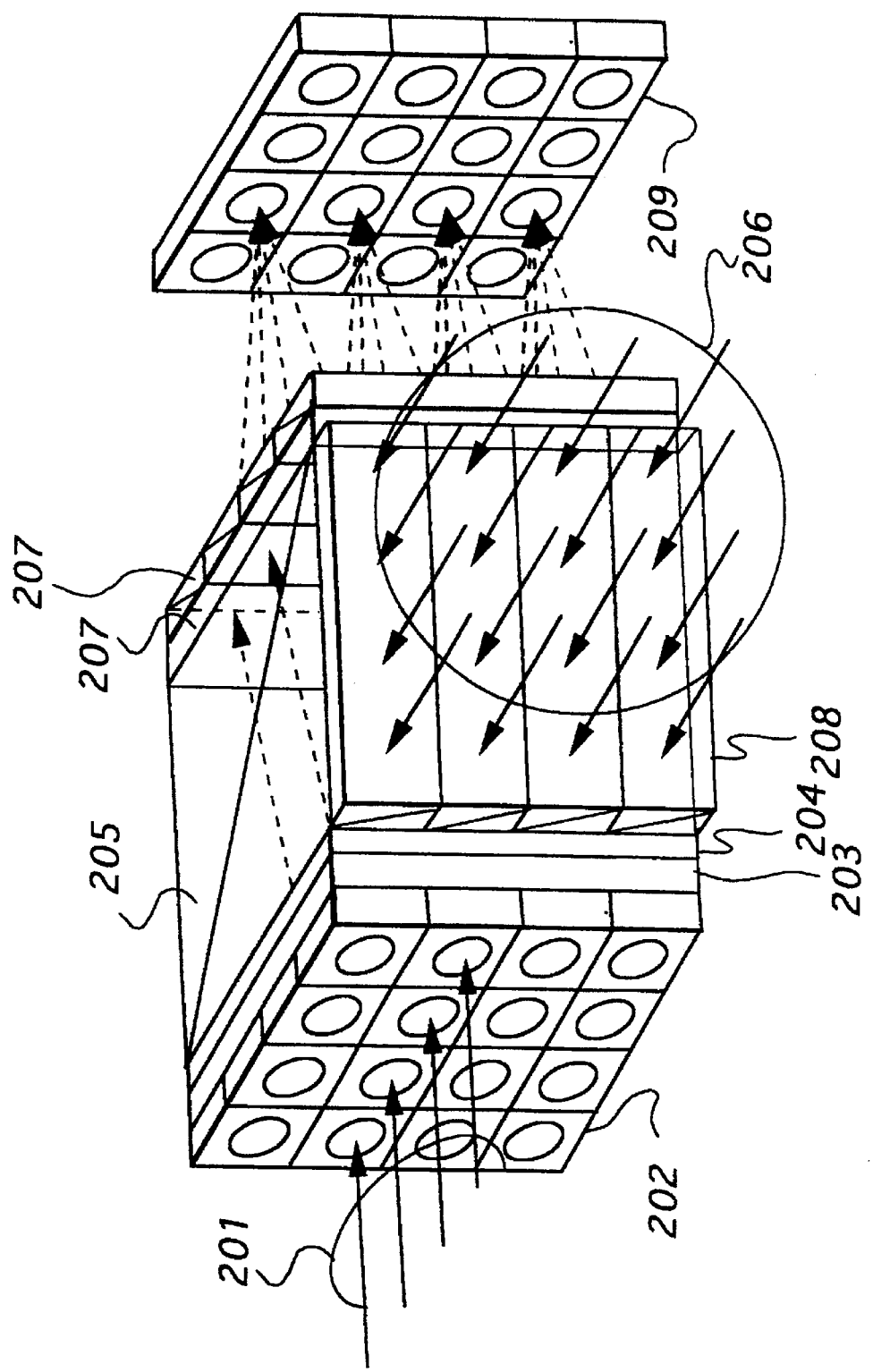
FIG. 20 is a perspective view of an N×N optical switch in accordance with the present invention.
Figure 21:
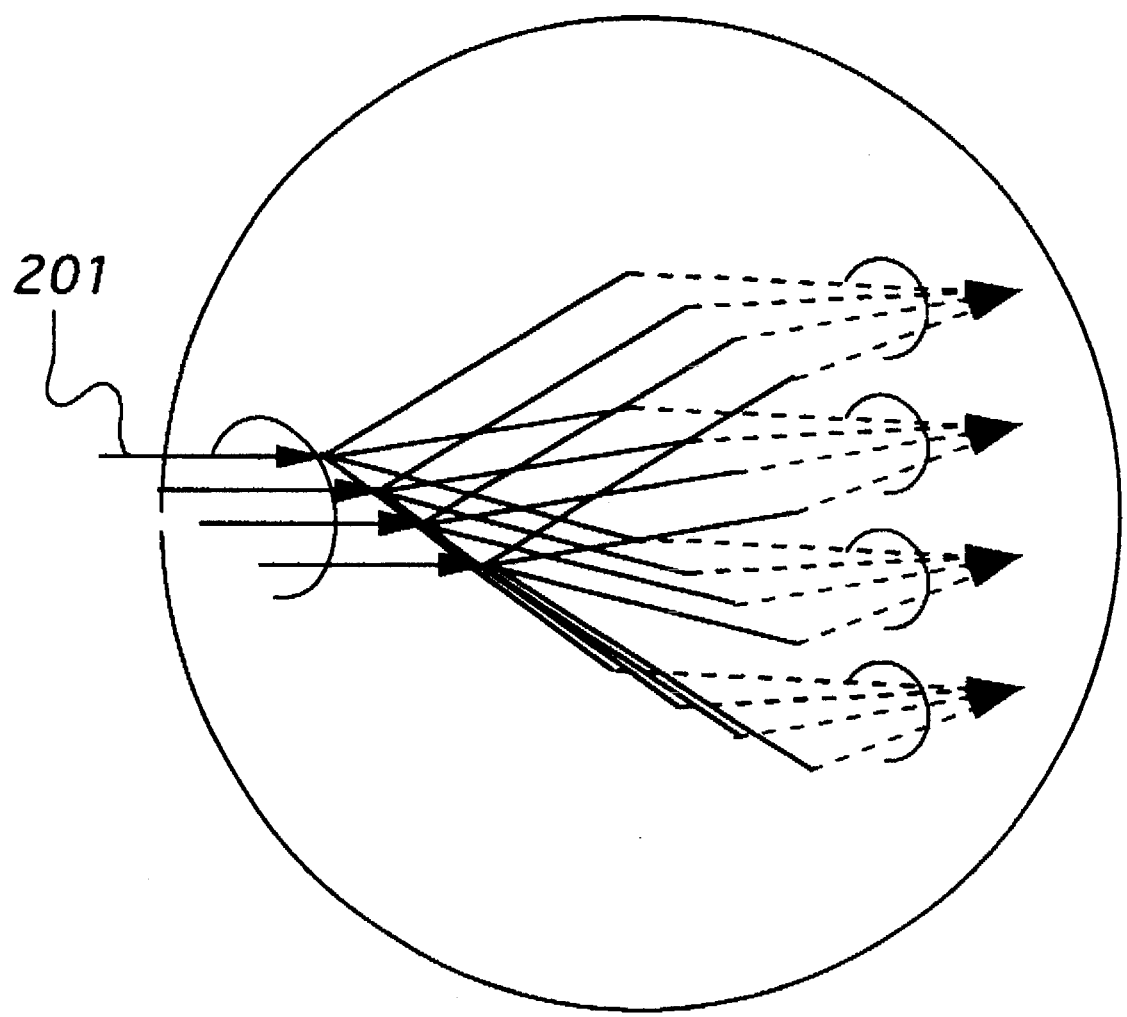
FIG. 21 is a schematic illustration of light-beams passing through the N×N optical switch of FIG. 20.
Figure 22:
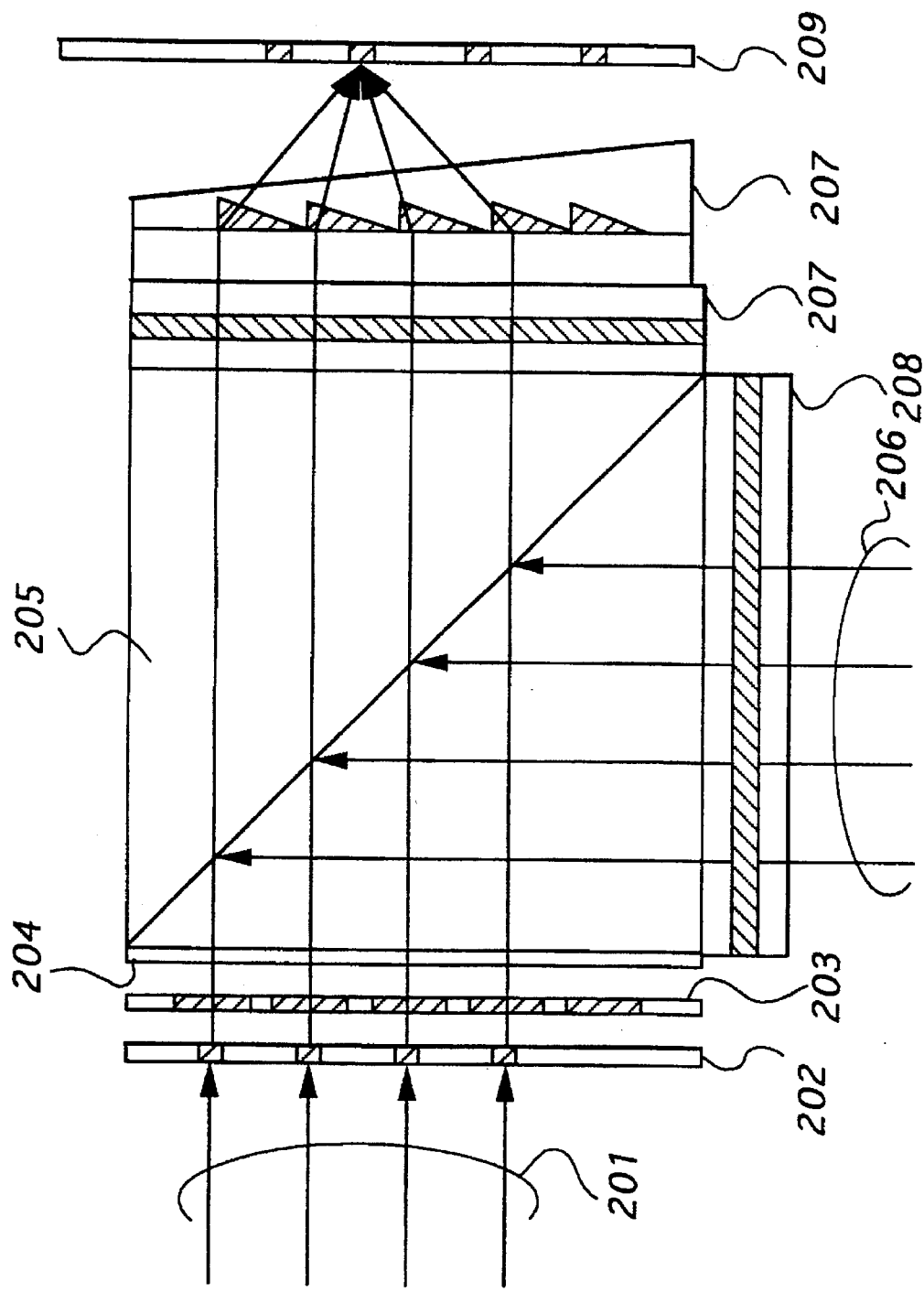
FIG. 22 is a plan view of the N×n optical switch of FIG. 20.

FIGS. 20 and 22 show a perspective and top views of an optical switch of an N×N (N means a positive number) type as one of the preferred embodiment of the present invention, respectively. In addition, FIG. 21 shows a diffraction pattern of the incident beams in the N×N optical switch.

The N×N optical switch comprises a non-emitting two-dimensional optical gate switch array 42, a micro-lens array 203, a λ/4 plate 204, a polarization beam splitter 205, and two liquid crystal microprism arrays 207, which are arranged in that order so as to form a cascade connection. In this example, a second liquid crystal microprism array having the structure as that of the forth preferred embodiment is placed on a side of the polarization beam splitter 205. In this example, however, the liquid crystal microprism arrays are arranged so as to form an intersection at right angles with each other. Therefore, it is possible to polarize the light-beam in a horizontal or vertical direction.

As shown in FIG. 21, input light-beams are bought together into the two-dimensional optical gate switch array 202 while the incident readout beams 46 are brought together into the liquid crystal microprism array 208 and introduced into a pixel of the two-dimensional optical gate switch array 202. Then the beams are reflected and passed through the liquid crystal microprism arrays 207. These arrays 207 deviates the beams through the certain angles, so that each beam changes its propagating direction and reaches into an incident pixel of a two-dimensional optical gate switch array 209 of the adjacent stage. At this time, the deflection of the light-beams can be occurred so as to construct the 4×4 optical switch. In addition, the polarization of the light-beams can be switched by selecting at least one beam from a group of sixteen readout beams 206.

The optical switches previously described in Examples 5–8 have polarization beam splitters for introducing the readout beams into an optical modulation side of the two-dimensional gate switch array. Also, it is possible to use S-polarized beams instead of the readout beams. In addition, these optical switches can be constituted by using half mirrors instead of the polarization beam splitters. In this case, there is no need to provide the λ/4 plate and polarize the readout beams.

EXAMPLE 9

Figure 23:
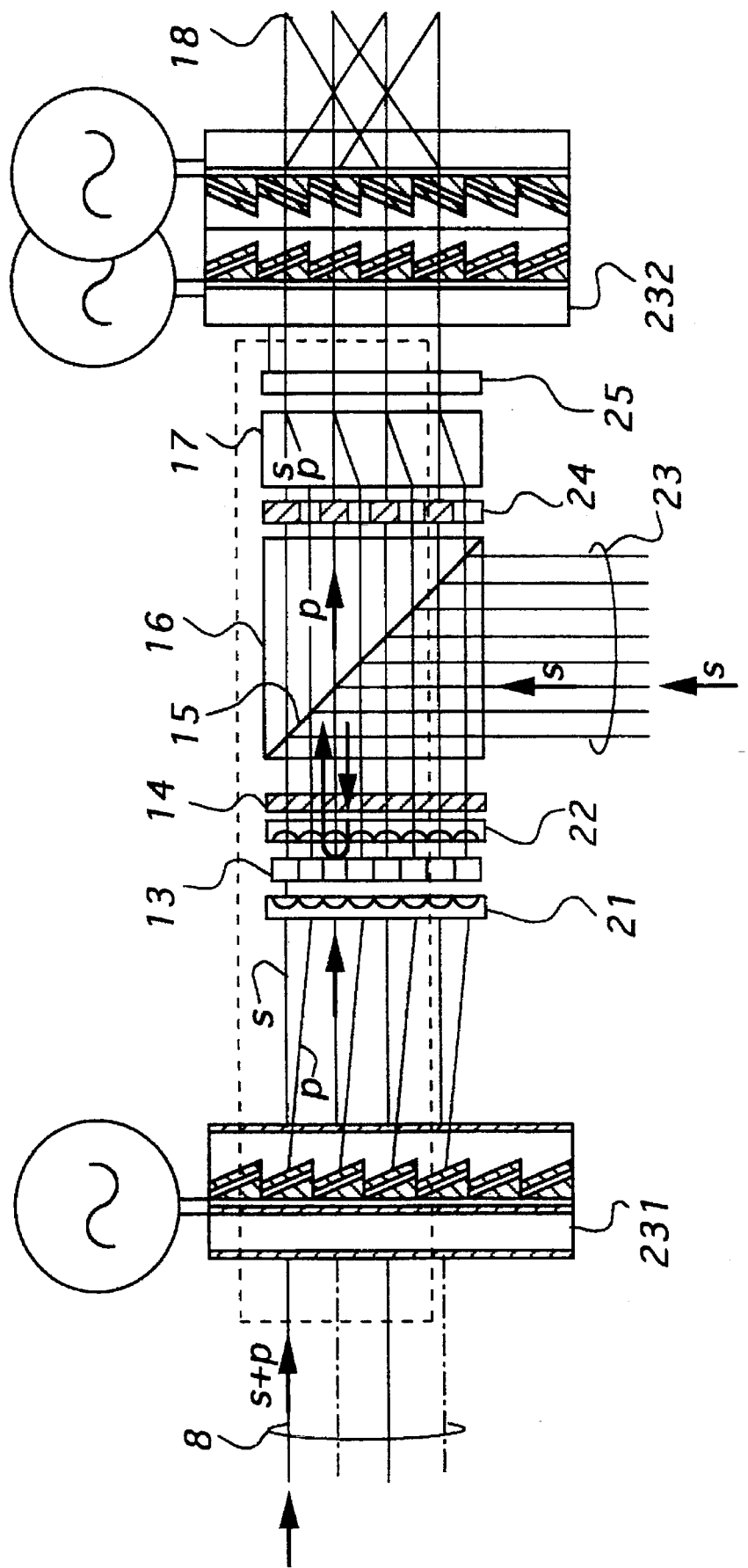
FIG. 23 is a schematic representation of an optical switch structure in accordance with the present invention.

FIG. 23 shows a schematic representation of an optical switch structure as a ninth preferred embodiment of the present invention. In this example, a liquid crystal microprism array 231 and a free-space optical interconnector 232 are used for connecting between two-dimensional optical gate switch arrays. The liquid crystal microprism array 231 has the same construction as that of the example 1. In the array, the transparent electrode is divided into a plurality of stripes corresponding to the grooves of the transparent base so as to control the voltage applied on each groove. On the other hand, the free-space optical interconnector 232 is formed as a two-stage structure of a horizontally-opposed liquid crystal microprism array pair.

The optical switch structure comprises a liquid crystal microprism array 231, a micro-lens array 21, a two-dimensional optical gate switch array 13, a micro-lens array 22, a λ/4 plate 14, a polarization beam splitter 16, a patterned λ/2 plate 24, a birefringent plate 17, a λ/4 plate 25, and a free-space optical interconnector 232, which are arranged in layers along the direction of propagating incident light-beams 8.

A group of input light-beams 8 is provided as a bundle of a plurality of independent light-beams arranged in a two-dimensional array in which each beam is a circularly polarized light. In the figure, however, the light-beams 8 are illustrated simply as a one dimensional array. These light-beams 8 are inputted into the liquid crystal microprism array 231. A pitch of each beam corresponds to a pitch of grooves in the array 231 and thus the beams pass through the liquid crystal in the respective grooves. In this case, when the polarized beam is parallel to the direction of aligning the liquid crystal molecules (i.e., s-polarization), it propagates without a deviation. When the polarized beam is perpendicular to the direction of aligning the liquid crystal molecules (i.e., p-polarization), the beam deviates from an original course by applying an alternating voltage between the transparent electrodes. It is possible to output the beam on an optional position by controlling the applied voltage approximately from 0 to 7 volts. In this example, as shown in the figure, a direction of transmitting the p-polarized beam is controlled so as to be passed through the space between the s-beams.

Output beams from the liquid crystal microprism array 231 strike the micro-lens array 21 consisting of a plurality of micro-lenses being arranged in two dimensions. These micro-lens correct the incident beams at corresponding focal points on a plane where the optical gate switch array 13 is positioned. Therefore, each light-beam can be introduced into a corresponding switch cell by adjusting and fixing the voltage applied on the liquid crystal microprism array 231.

Figure 24:
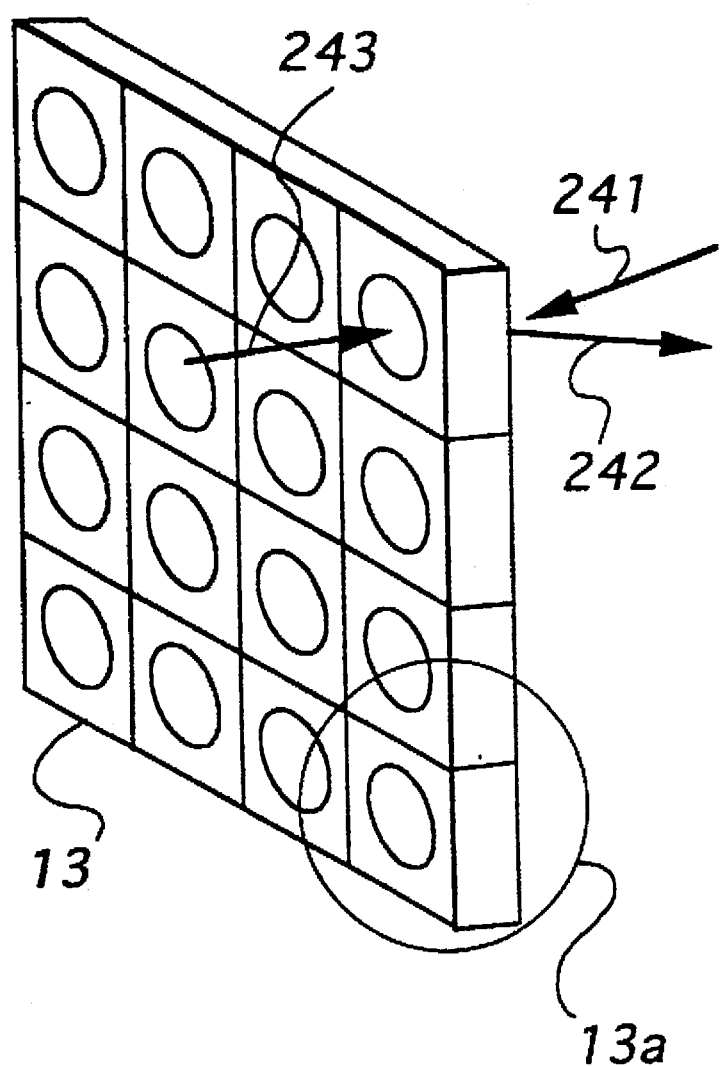
FIG. 24 is a perspective view of a two-dimensional optical gate switch array in accordance with the present invention.
Figure 25:
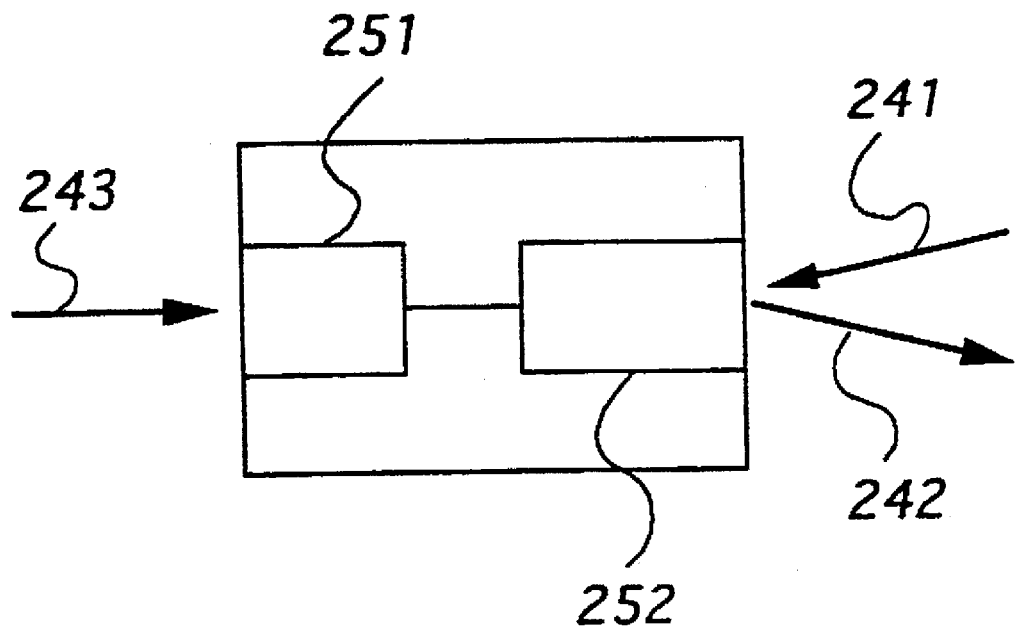
FIG. 25 is a plan view of a unit cell of the two-dimensional optical gate switch array in accordance with the present invention.
Figure 26:
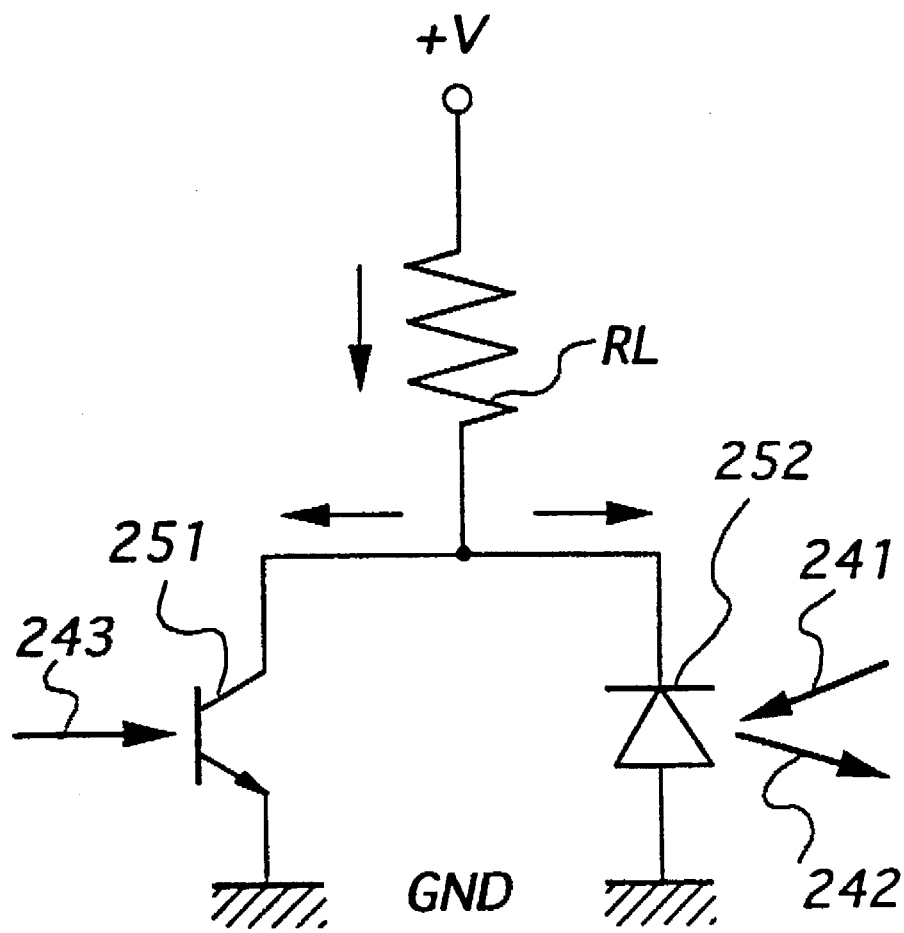
FIG. 26 is an equivalent circuit of the unit cell of the two-dimensional optical gate switch array in accordance with the present invention.

FIGS. 24–26 show one of the examples of the two-dimensional optical gate switch array as disclosed in the document of Matsumoto et al. (S. Matsumoto, C. Amano, and Kurokawa, "Operation Characteristics of Three-terminal Hybrid Structure with Multiple-Quantum-Well Reflection Modulator and He75ojunction Phottransistor" pp. 330–332 IEEE Photonics Technology Letters vol. 3, No. 4, April 191). FIG. 24 illustrates a whole construction of the two-dimensional switch array 13 in which a plurality of unit cells 13a are arranged in two dimensions. Also a cross-sectional view and equivalent circuit diagram of the unit cell are shown in FIGS. 25 and 26, respectively.

The unit cell comprises a phototransistor 251 on an input side portion thereof and an optical strength modulator 252 on an output side portion thereof. These two elements are electrically connected by the equivalent circuit. When the input beam 243 strikes the phototransistor, a terminal voltage of the phototransistor is changed in accordance with an amount of luminous energy of the input beam. Then a terminal voltage of the optical strength modulator 252 is also modulated to change its refractive index which results in a modulated optical strength of a readout beam 241 entering into the optical strength modulator 252 to generate an output beam 242. When a beam with a constant optical strength is supplied as the readout beam 241, the output beam 242 may be equal to amplified input beam 243. When the readout beam 241 is cut off, on the other hand, the output beam 242 is not generated. Therefore, each cell can be used as an optical switch in the type of 1-input and 1-output (1×1).

In FIG. 23, a bundle of the readout beams is entered into the two-dimensional array 13 from the opposite direction of propagating the incident beam. A bundle of the readout beams 241(i.e., s-polarization) from a low side of the polarization beam splitter 23 is reflected at a reflection surface RT of the splitter 16. The direction of propagating the reflected beams is changed toward the λ/4 plate. The beams passing through the λ/4 plate are circularly polarized and then collected at the optical strength modulator of each unit cell in the two-dimensional optical gate switch array 13. In these beams, the beam that reflected at the array 13 changes the direction of propagation and then passes through the λ/4 plate 14 to change its polarization. Thus the output beams from the λ/4 plate 14 become p-polarized beams passing through the polarization beam splitter 16 and coupled with the respective s-polarized beams which are separated from the p-polarized beams of the input beams 8. After the coupling, the coupled beams are introduced into the free-space optical interconnector 232. Each beam is inputted into a corresponding liquid crystal in the grooves because these grooves are formed with a pitch that corresponds to that of the optical beams.

In the free-space optical interconnector 232, the course of the incident beams is vertically curved downwardly or upwardly by placing an ac voltage between the transparent electrodes. Therefore, each beam can be outputted into an optional point by regulating the voltage applied on each separated segment of the transparent electrodes. For example, two light-beams can be coupled as shown in the figure by regulating alternate segments of the transparent electrodes.

In the figure, the beams are alternately coupled. However it is also possible to couple one beam with another allowing a two beam spacing. Furthermore, any type of optical connection can be performed by an optical network such as a banyan, shuffle, and cross-over network. Accordingly, the conventional network of optical switches can be easily arranged by means of free-space optical interconnection. In the arrangement of the optical switch shown in FIG. 23, a portion surrounded by a dot line forms a 2×2 optical switch which corresponds to an optical element to be functioned as one stage of the banyan network. Therefore, a plurality of the 2×2 optical elements will form a multiple-staged construction corresponding to the banyan network.

EXAMPLE 10

Figure 27:
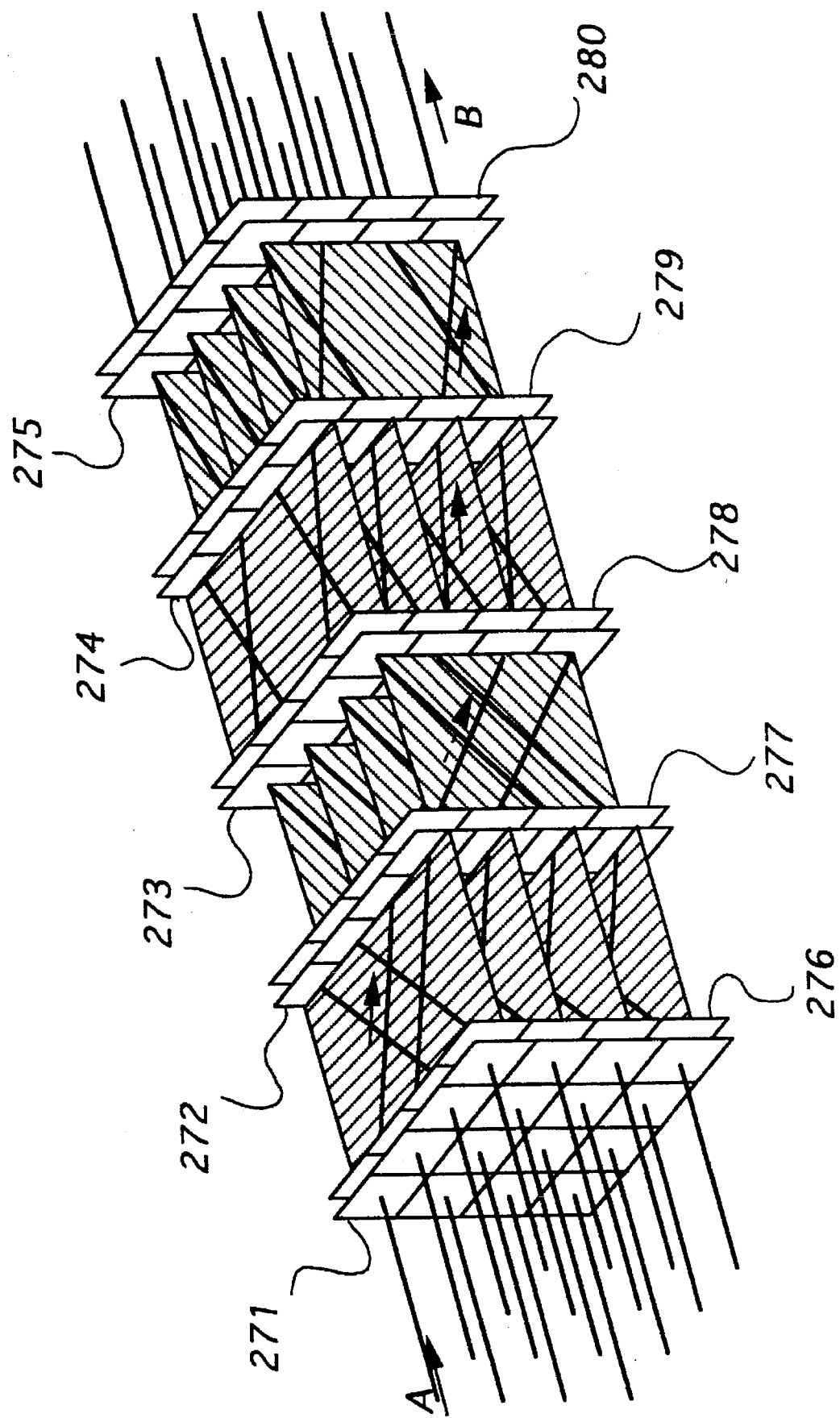
FIG. 27 is a perspective view of a banyan network in accordance with the present invention.

FIG. 27 shows a banyan network as a tenth preferred embodiment of the present invention. The banyan network is constituted by connecting two-dimensional optical gate switch arrays 271-275, a liquid crystal microprism arrays or free-space optical interconnectors 276-280 as a multiple-staged one.

EXAMPLE 11

Figure 28:
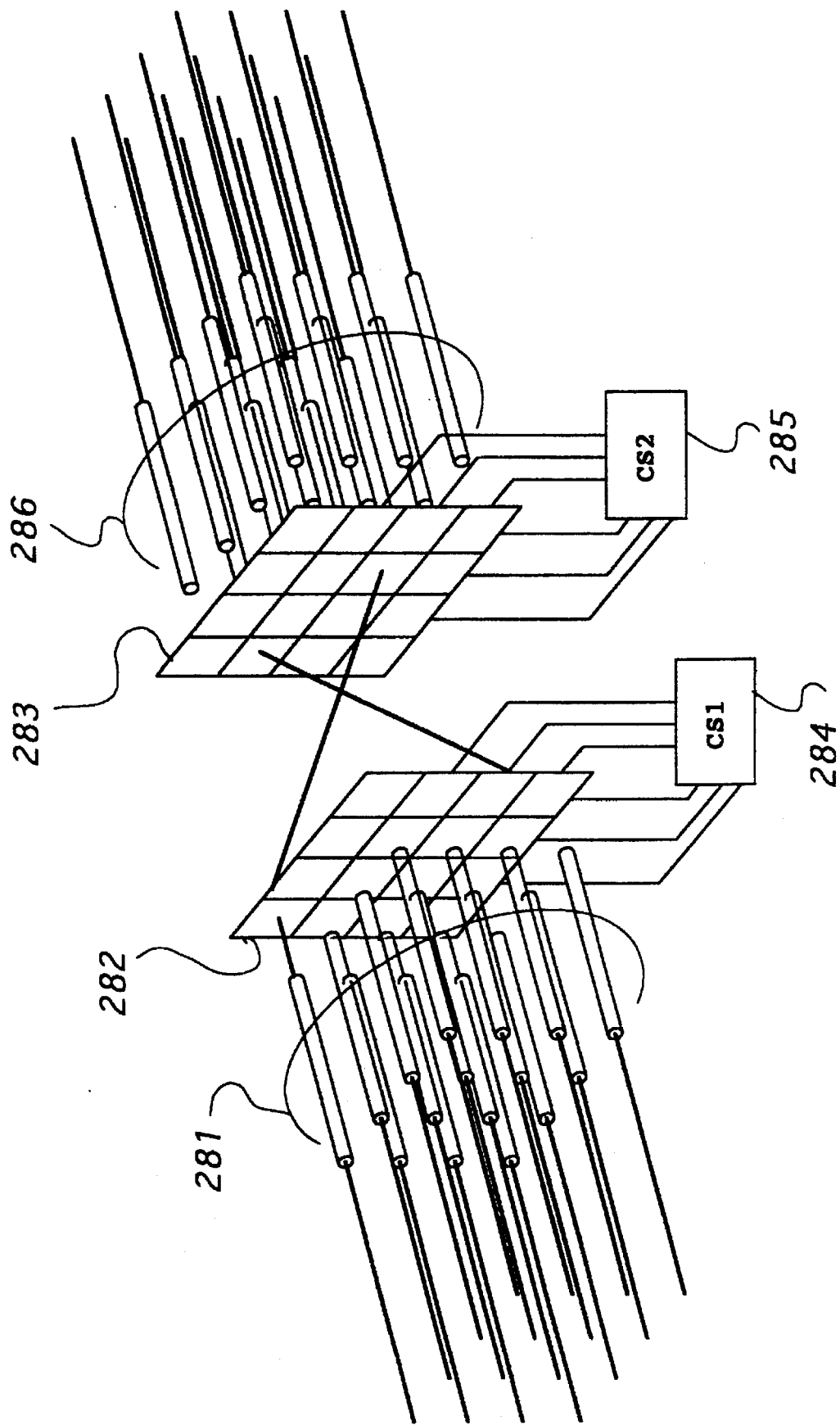
FIG. 28 is a perspective view of a 16×16 optical switch in accordance with the present invention.

FIG. 28 shows an optical switch in the type of having 16 input terminals and 16 output terminals (i.e., 16×16 optical switch) as an eleventh preferred embodiment of the present invention.

The 16×16 optical switch comprises an input fiber array 281 consisting of a plurality of input fibers with collimating lenses; liquid crystal microprism arrays or free-space optical beam interconnectors 282, 283 having a plurality of pixels; an output fiber array 286 with collimating lenses; and power supplies 282, 283 for regulating a voltage applied on each pixel. The power supplies 284, 285 is controlled by a memory device (not shown) which stores the information concerned about a suitable voltage for switching beams before the expected time. The power supplies 284, 285 switching is required. Then the power supplies 284, 285 apply the suitable voltage between the liquid crystal microprism array or free-space optical beam interconnector 282, 283. Consequently, the incident beams from the input optical fiber array IF1 are outputted on a position of output optical fiber array 286. In this case, furthermore, when the light-beam is inputted at a certain angle against the output optical array 286, a percentage of loosing the beam may be increases. In this example, therefore, each optical fiber receives the input beam at an angle of 0° by the liquid microprism array or the free-space interconnector 283 which is the same one as that of the input side. Consequently, a 16×16 optical switch that has properties of holding the light-beams without losing can be obtained.

The present example not only suitable for providing the 16×16 optical switch but also suitable for optical-couplings among sixteen optical fibers through free-space because of the following reasons. A deficient precision of positioning the optical fiber array and the lens array causes that a group of the output beams of the optical fiber array having collimating lenses cannot be parallel perfectly in general. Therefore, when the group of beams is received by the same optical fiber array as that of the input side, the coupling loss becomes 20 dB or more. As shown in FIG. 27, however, when the liquid crystal microprism array or free-space optical beam interconnector is provided between the input and output optical fiber arrays, a course and an angle of propagating the light-beam can be individually adjusted and thus the coupling loss of light can be improved up to about 1 dB.

EXAMPLE 12

Figure 29:
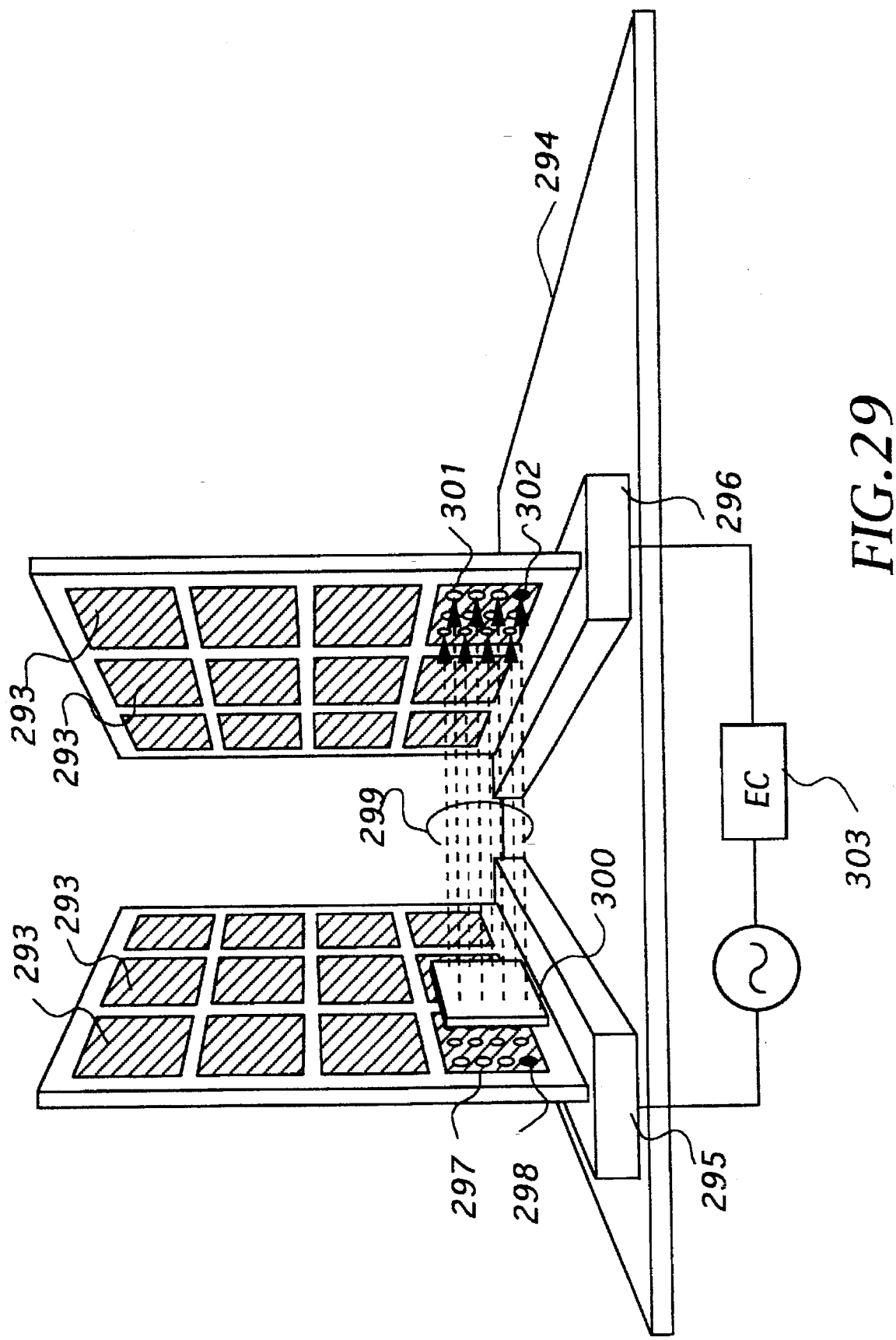
FIG. 29 is a perspective view of an interconnection between LSI boards by means of a free-space optical interconnector in accordance with the present invention.

FIG. 29 shows an interconnection between LSI boards by using a free-space optical interconnector as a twelfth preferred embodiment of the present invention.

Each one of the LSI boards 291, 292 comprises a plurality of LSIs (large scale integration circuits) 293 arranged on a surface of thereof. The boards 291, 292 are stood on a substrate 294 by inserting their end portions into slots 295, 296 spaced 1 inch (approximately 25 mm). For performing optical interconnection between the boards in free-space, two boards 291, 292 must be positioned in a precise manner with a deviation only slightly or within acceptable limits of under 10 μm order. In the conventional interconnection, however, the precise arrangement of these boards cannot be performed.

As shown in the figure, the fist board 291 has a surface emitting laser (SEL) array 297 which converts a result of electric processing in the LSIs into a light-beam by modulating each laser at a high speed. Instead of the SEL array 297, it is possible to use an optical source array or MQW two-dimensional optical intensity modulator. On the other hand, the first board 291 has a surface emitting laser array as a position sensor (DSEL) 298 by which a continuous light-beam can be emitted. The light-beam emitted by the SEL 297 or DSEL 298 is introduced into a free-space optical interconnector 300 via a micro-lens array (not shown). The light-beam is a plane-polarized beam in one direction corresponding to the direction of alignment of liquid crystal molecules in the free-space optical interconnector 300 where the light-beams 299 are polarized as a whole in vertical and horizontal directions. In this example, the interconnector 300 is a four staged structure of free-space optical interconnector units having a plurality of transparent electrode segments uniformly formed on a plane.

Optical signals from the SEL 297 or DSEL 298 are converted into electric signals by means of a photo-detector array 301 and transmitted into each LSI on the board 292. On the other hand, another type of the photo-detector 302 is formed on the board 292 for constantly detecting the position of the light-beam from the surface-emitting laser array 298. For obtaining the maximum output from the photo detector 302, the optical output controller controls a power source 303 to regulate a driving current to be supplied to the free-space optical interconnector 300. The location of each light-beam can be reflected throughout the location of each cell in the surface emitting laser array, so that the location of all of the light-beams IB can be precisely controlled by precisely adjusting the course and angle of only one of the light-beams.

Consequently, the light-beams can be optical interconnected with a predetermined position of the optical detector array without making sure that one board 291 (or 292) is in proper alignment with another board 292 (or 291). The data can be transmitted from the board 291 to the board 292 by means of the free-space optical interconnection in spite of causing the deviation of location of two boards by the insertion and extraction of the board, mechanical vibrations, distortion, or the like.

EXAMPLE 13

Figure 30:
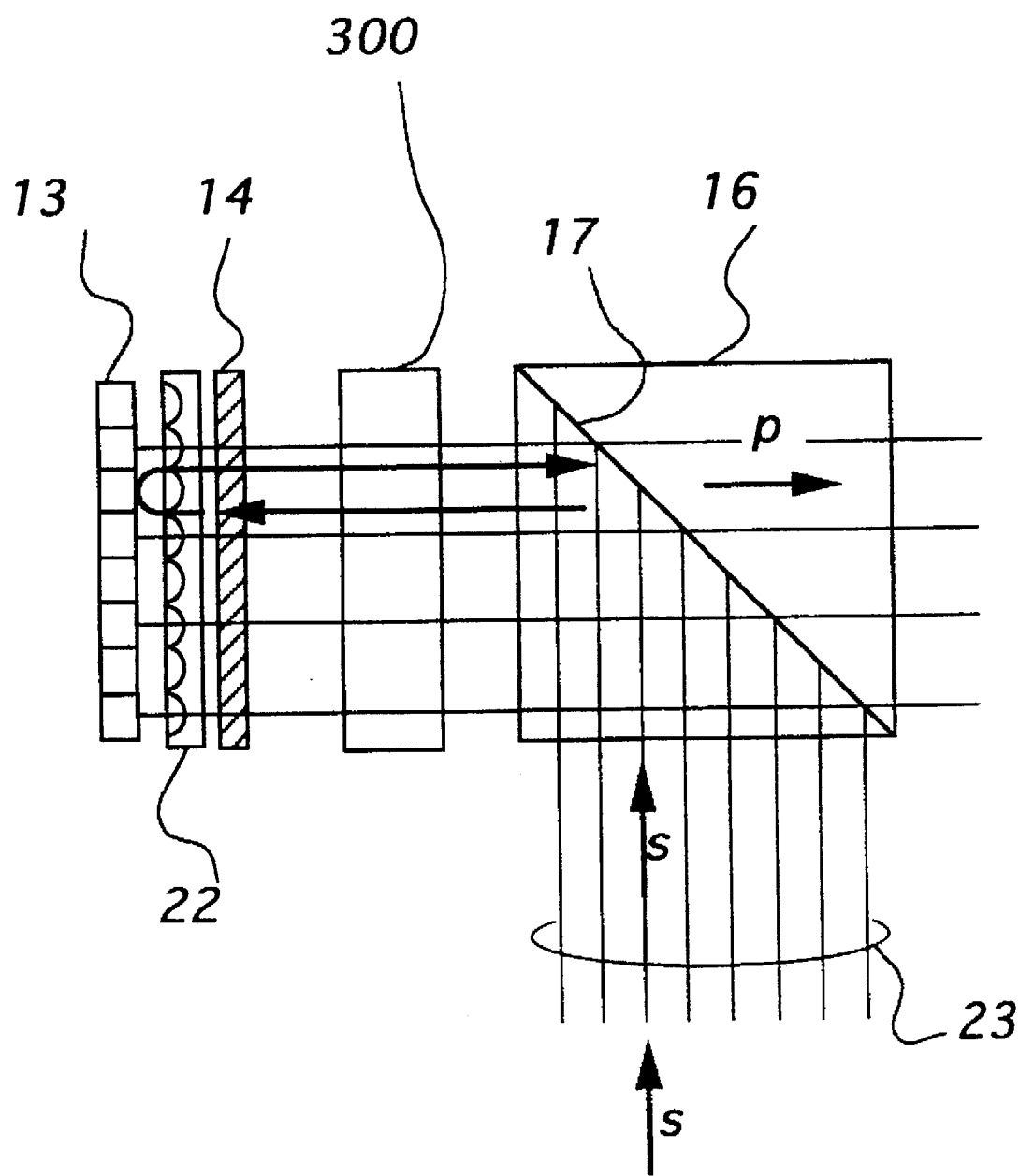
FIG. 30 is a plan view of a free-space optical interconnector in accordance with the present invention.

An optical switch structure as a thirtieth preferred embodiment of the present invention is the same one as that of Example 9 except the follows. In this example, a liquid crystal microprism array or a free-space optical interconnector 300 is also used for connecting between the polarization beam splitter 16 and the λ/4 plate 14 (FIG. 30). The liquid crystal microprism array has the same construction as that of Example 1.

Figure 31:
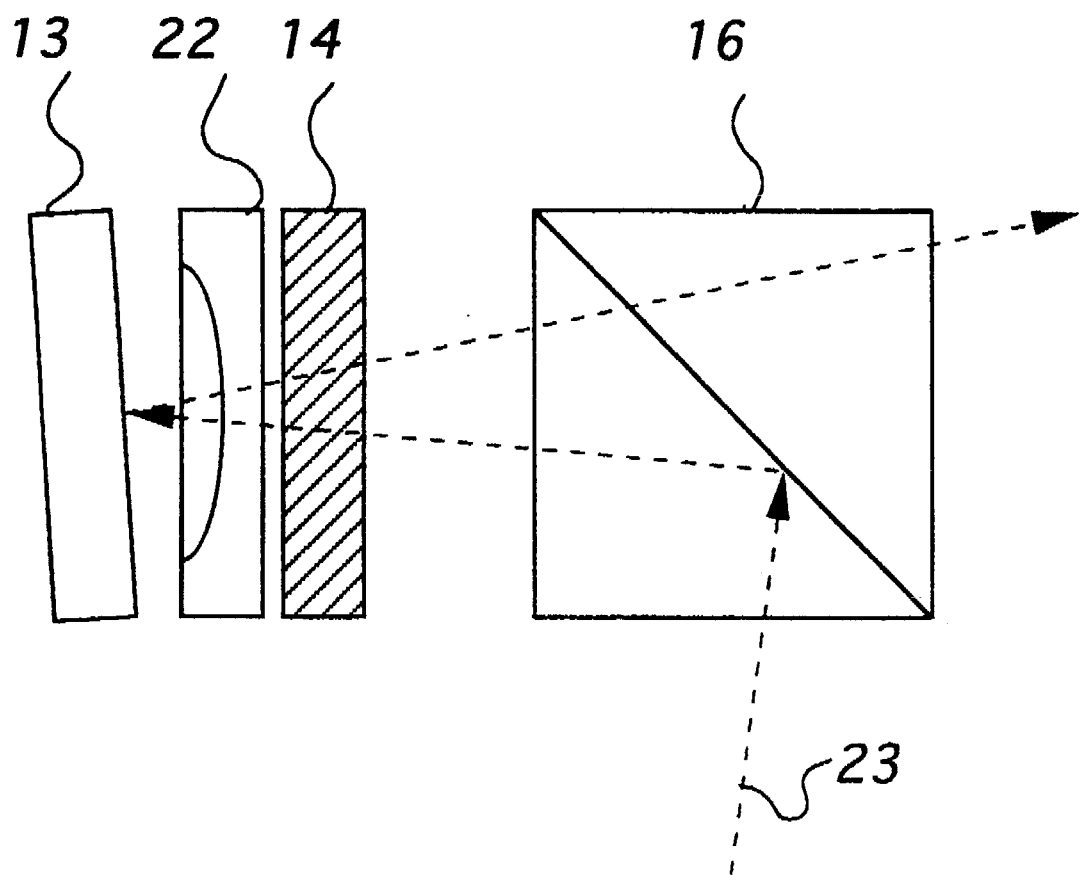
FIG. 31 is a plan view of a combination of a polarization beam splitter and a λ/4 plate with an free-space optical interconnector in accordance with the present invention.
Figure 32:
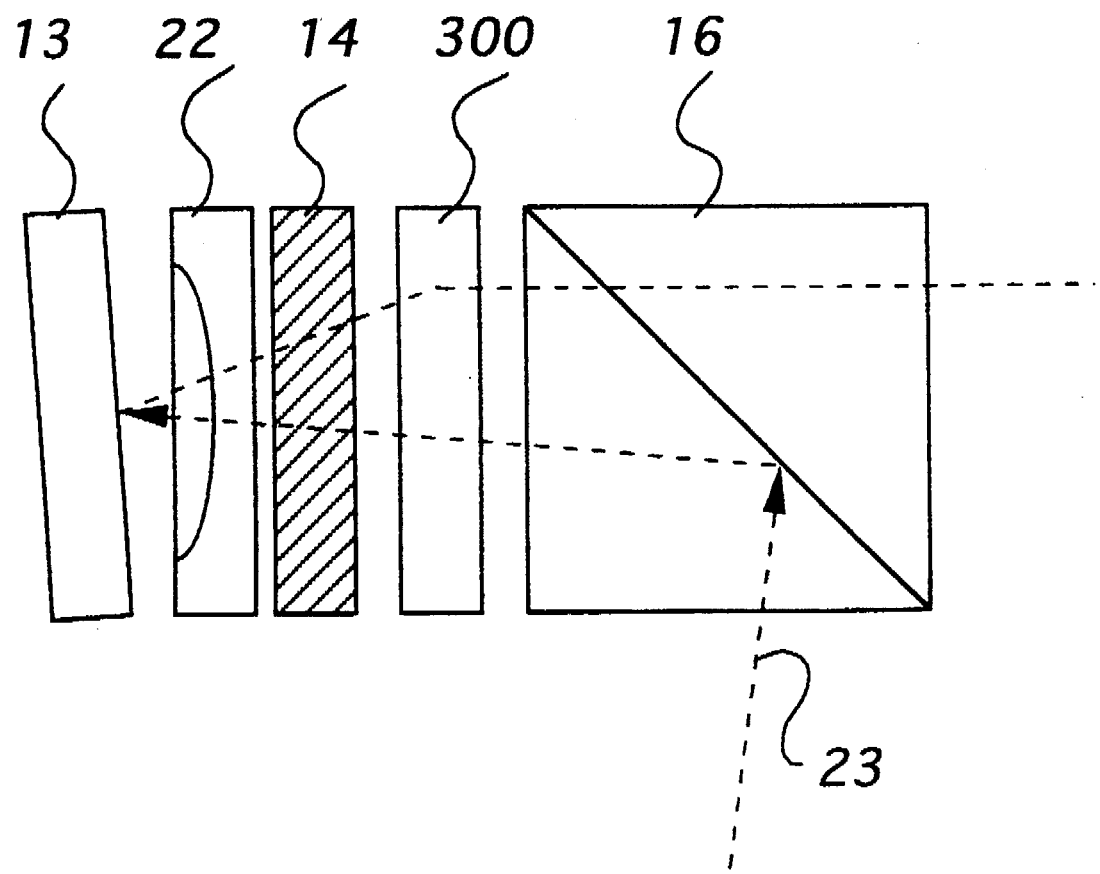
FIG. 32 is a plan view of a combination of a polarization beam splitter and a λ/4 plate without an free-space optical interconnector.

FIGS. 31 and 32 show structures of polarization beam splitter 16 and the λ/4 plate 14 without or with the free-space optical interconnector 193, respectively.

In the structure without the interconnector 300, inclined reflection beams are generated by passing inclined input beams through the polarization beam splitter 16 and the λ/4 plate 14. Also, inclined reflection beams are generated when the two-dimensional optical gate switch array 13 is inclined. Therefore, the two-dimensional optical gate switch array 13, the polarization beam splitter 16, the readout beams 23 must be positioned without deviating from their correct horizontal or vertical positions by adjusting their inclined angles.

In the structure with the interconnector 300, on the other hand, the input beams can be controlled their deflecting conditions by applying a voltage on the free-space optical interconnector 193. Thereby inclined reflection beams are not generated by passing inclined input beams through the polarization beam splitter 16 and the λ/4 plate 14 or when the two-dimensional optical gate switch array 13 is inclined. When the readout beams 23 are polarized in the direction which is perpendicular to the direction of alignment of the liquid crystal molecules, the readout beams travel in a direction at right angles to an inlet side of the free-space optical interconnector 193 and reflects at a reflection surface 15 to travel in a straight line toward the λ/4 plate 14. The beams passed through the plate 14 strike on the two-dimensional gate switch array 13 and reflected. Then the beams pass through the λ/4 plate 14 in which the beams are polarized in parallel to the direction of alignment of the liquid crystal molecules.

EXAMPLE 14

Figure 33:
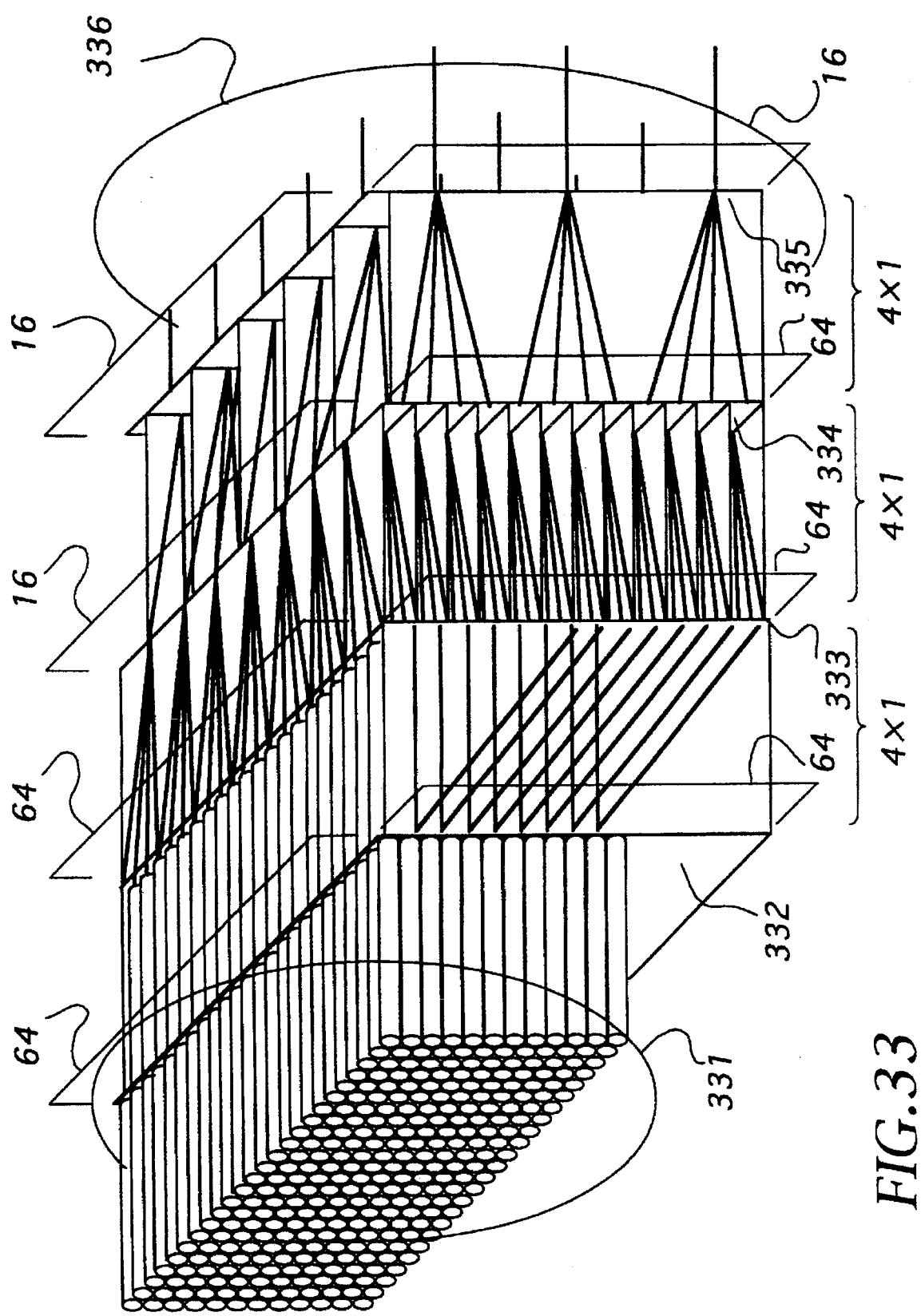
FIG. 33 is a perspective view of a 2048×256 optical switches in accordance with the present invention.

FIG. 33 shows an optical switch in the type of having 2048 input terminals and 256 output terminals (i.e., 2048×256 optical switch) as a fourteenth preferred embodiment of the present invention. The 2048×256 optical switch is formed as a combination of 1×2 optical switch units and 4×1 optical switch units of Examples 5–8.

The 2048×256 optical switch comprises a 32×64 input optical fiber array, 64×64 light-emitting type two-dimensional optical gate switch arrays 52–55, and a 16×16 output optical fiber array.

In this example, the 64×64 light-emitting two-dimensional optical gate switch arrays 332–335 are bounded with liquid microprism arrays or free-space optical interconnectors (not shown). The first gate switch array 332 is able to act as a 1×2 expanding switch. The second and third gate switch arrays 333, 334 acts as 4×1 optical switches. The fourth gate switch array 335 acts as a coupler for coupling the beams with the output optical fibers 336.

The optical switch of the present example is basically composed of three stages. In the first stage, the numbers of the input beams are expanded in the first step while the numbers of the input beams are compressed to ¼. The reason for expanding the numbers of the input beams is that a simple collection of the beams causes a high rate of stopping the light-beam propagation. If an extremely low rate of stopping the light-beam propagation is required, the numbers of the input beams are expanded for four or eight folds.

EXAMPLE 15

Figure 34:
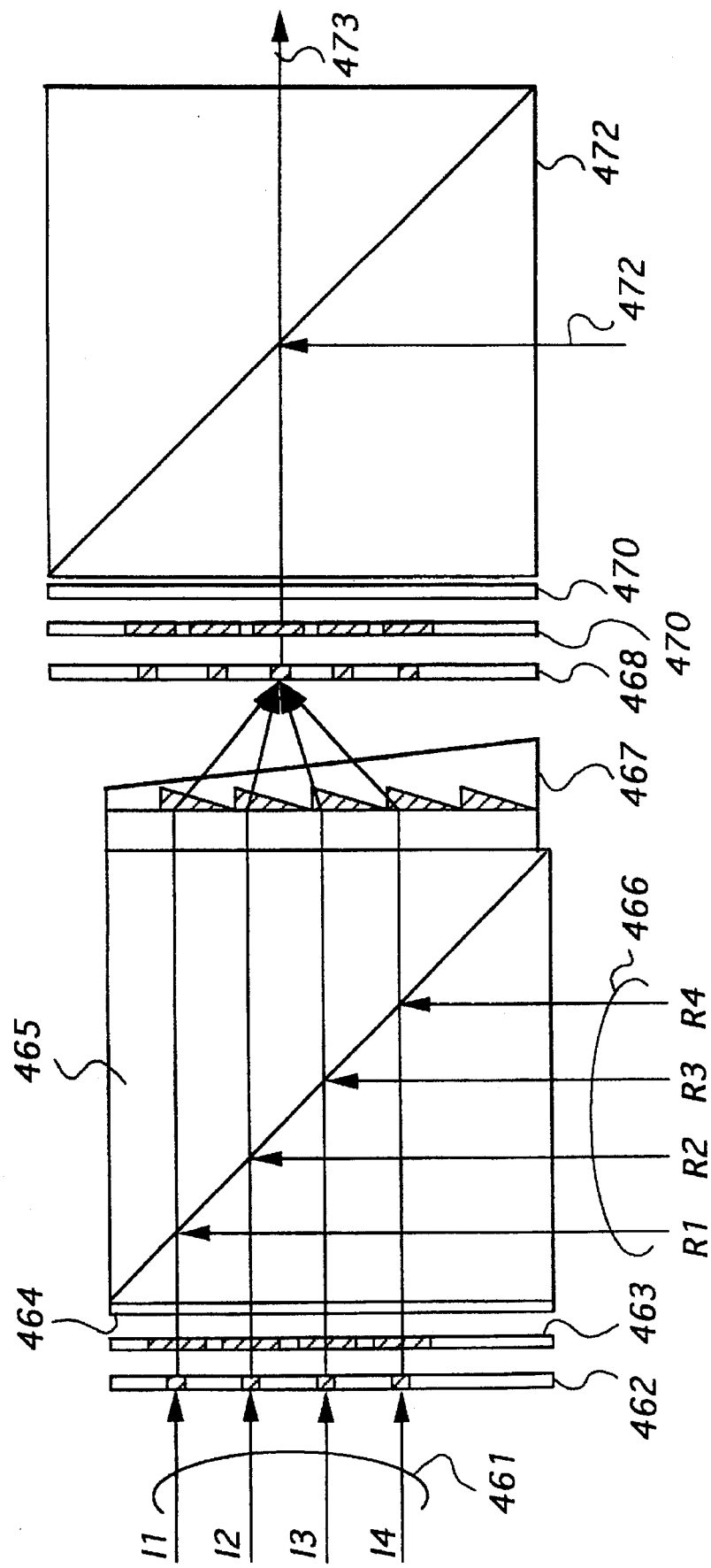
FIG. 34 is a plan view of a 4×1 optical switch for performing time division multiplexing in accordance with the present invention.

FIG. 34 shows a 4×1 optical switch in the type of performing time division multiplexing as a fiftieth preferred embodiment of the present invention.

The 4×1 optical switch comprises a non light-emitting two-dimensional optical gate switch array 462, a micro-lens array 463, a λ/4 plate 464, and a polarization beam splitter 465.

In the figure, numeral references 461, 472, and 473 indicate groups of input beams, readout beams, and output beams, respectively.

In this example, the input beams are multiplexed in the first stage and converted into one beam of light to coupling with a single mode optical fiber in the second stage. For the input beams I1–I4, NRZ digital signals are inputted.

Figure 35:
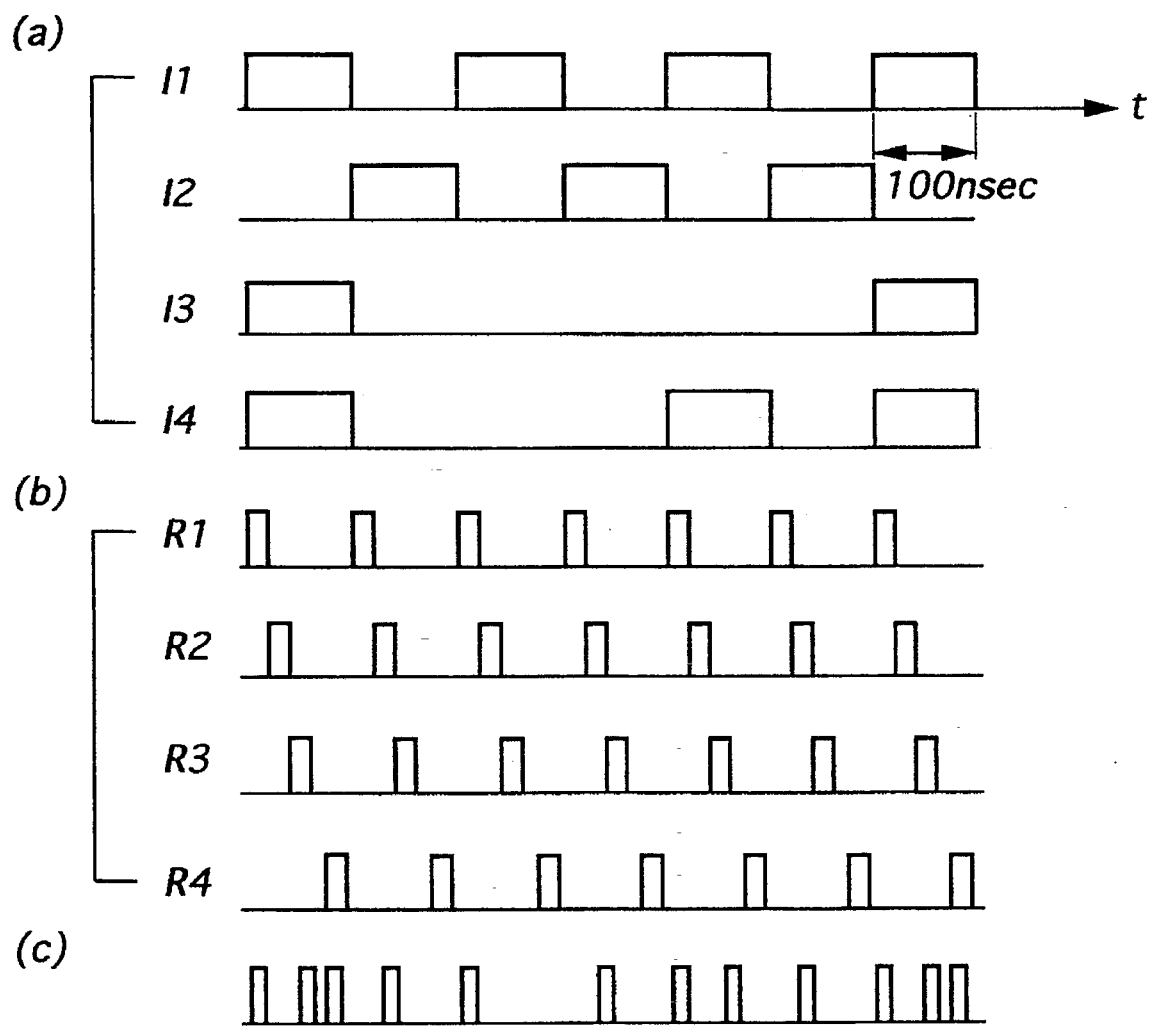
FIG. 35 is a wave form chart of (a) an input beam, (b) a readout beam, and (c) an output beam in accordance with the present invention.

FIG. 35 shows wave-forms of (a) the input beam, (b) the readout beam, and (c) the output beam, respectively. The wave speed of each beam takes 10 Mbit/second. For the readout beams R1–R4, pulses at a high speed of 40 Mbit/second are inputted, and read from first to fourth pixels R1–R4 of the two-dimensional optical gate switch array 62 in rotation, so that the output beams 473 are outputted by performing time division multiplexing of the input beams I1–I4.

The optical switch of the present invention easily performs the time division multiplexing of the input beams without converting optical signals into electric signals and multiplexing the converted signals or using an optical delay line.

In this example, the 4×1 optical switch is used but not limited to. It is possible to provide a 900×1 time division multiplexing switch by putting a plurality of horizontal planes of 30×1 time division multiplexing switches.

EXAMPLE 16

Figure 36:
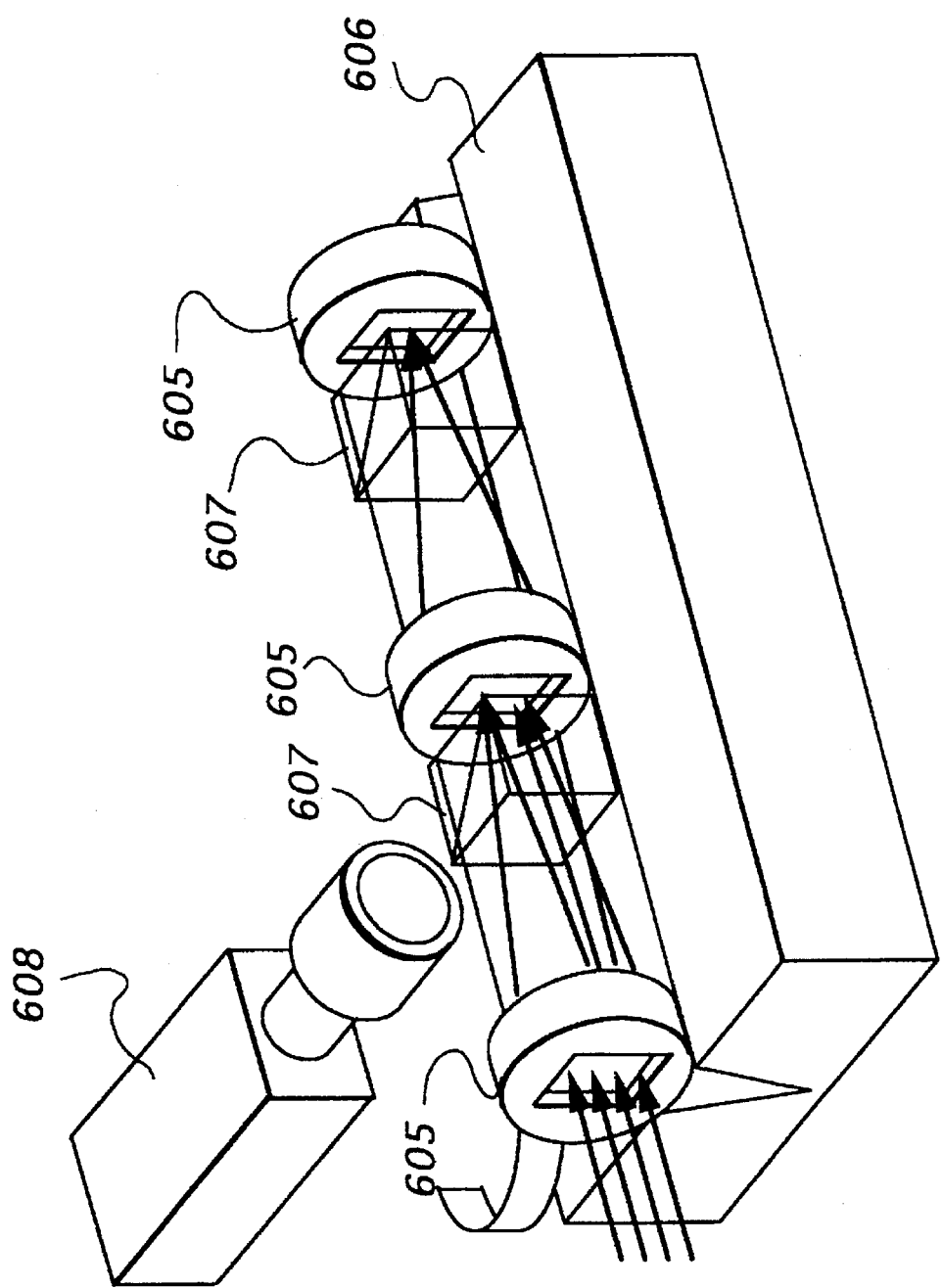
FIG. 36 is a perspective view of a system implementing an optical switch in accordance with the present invention.

FIG. 36 shows a system that implements an optical switch as a sixteenth preferred embodiment of the present invention.

The system comprises a light-emitting two-dimensional optical gate switch array 601, a micro-lens array 602, a liquid crystal microprism array 603, a liquid crystal macro prism 604, a cylinder-like holder 605, a V-shaped groove holder 606, a half mirror or a polarization beam splitter 607 with a λ/4, and a monitor camera 608.

The liquid crystal microprism array 603 is prepared by filling a liquid crystal in a space of a wage-shaped support formed by two glass plate. In this case, the deflection angle is small but there is no need to assign each beam to a corresponding microprism array. Thus the liquid crystal microprism array 603 can be easily arranged in the system.

The cylindrical holder 605 holds the two-dimensional optical gate array 601 sandwiched between the micro-lens arrays 602, the liquid crystal microprism array 603, and the liquid crystal macro prism 604, respectively, in that order to make into a whole with by integrating their axes.

Figure 37:
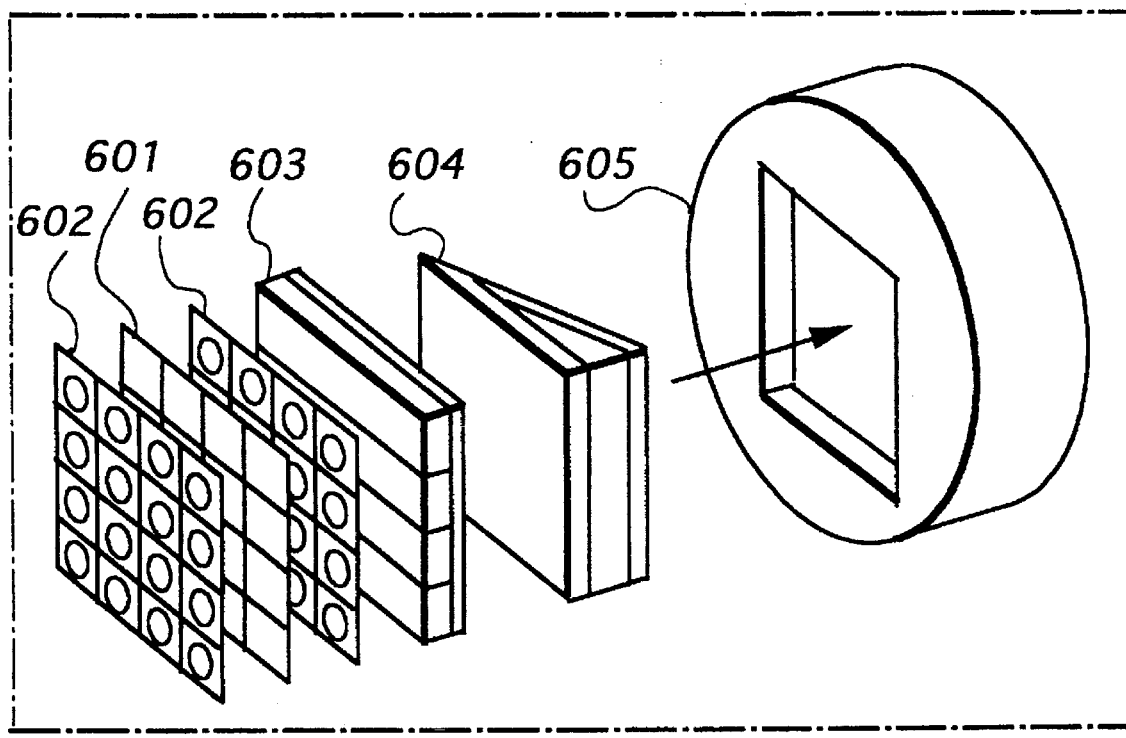
FIG. 37 is a perspective view of a cylindrical holder in accordance with the present invention.

For connecting the optical switches as a multiple-staged one, it is important to integrate the central axes of the optical switches and keep their angles against each other. In this example, therefore, the cylinder holders 605 are arranged in the V-shaped groove 606, that is, the optical switches in the cylinder holders 605 can be co-axially arranged in a line (see FIG. 37).

An output beam from the optical switch is inputted into N×1, 1×N, or N×N optical switch unit and then monitoring the beams passing through the optical switch unit to interconnect between the two-dimensional optical gate switch arrays by adjusting a rotation of the cylinder holder 605 and adjusting the voltages applied on the liquid crystal microprism array 604 and liquid macro prism 603.

Accordingly, various types of the optical switches can be realized by forming a multiple-stage on N×1, 1×N, and N×N optical switch units which are prepared by combining two-dimensional optical gate switch array and the liquid crystal microprism array.

The present invention has been described in detail with respect to preferred embodiments, and it will now be that changes and modifications may be made without departing from the invention in its broader aspects, and it is the intention, therefore, in the appended claims to cover all such changes and modifications as fall within the true spirit of the invention.

What is claimed is:

1. A liquid crystal microprism array comprising:

a first transparent substrate;

a transparent electrode divided into a plurality of electrode segments on a first surface of said first transparent substrate;

an alignment layer on a first surface of said first transparent substrate to cover said transparent electrode;

a second transparent substrate having a first surface facing said first surface of said first transparent substrate;

a transparent electrode on a first surface of said second transparent substrate;

an alignment layer on a first surface of said second transparent substrate to cover said transparent electrode;

a power supply for placing a voltage between said transparent electrodes;

a plurality of grooves formed on said first surface of said second transparent substrate;

a plurality of spaces divided by ridges of said grooves; and a liquid crystal layer sandwiched by said first and second transparent substrates.

2. A liquid crystal microprism array as claimed in claim 1, wherein said grooves have a shape of toothed edges of a saw in cross section, and each one of said grooves is formed as in the shape of a right-angled triangle having an inclined surface and a vertical surface in cross section.

3. A liquid crystal microprism array as claimed in claim 1, wherein said liquid crystal layer is comprised of a plurality of liquid crystal cells each of which is shaped like a right-triangle in cross section and placed in a different one of said spaces with a connection with adjacent liquid cells to an extent of without causing a bad influence on each other.

4. A liquid crystal microprism array as claimed in claim 1, wherein a thickness of said second transparent substrate is gradually reduced to form an inclined flat surface thereof.

5. A liquid crystal microprism array as claimed in claim 1, wherein at least one of said transparent electrodes is divided into a plurality of electrode segments as rectangular patterns of dots so as to correspond to incident beams.

6. A liquid crystal microprism array as claimed in claim 1, further comprising:

thin film transistors corresponding to the respective segments of said transparent electrode provided on said first transparent substrates.

7. A free-space optical interconnector comprising:

a plurality of liquid crystal microprism arrays which are placed one behind the other, each having:

a first transparent substrate;

a transparent electrode on a first surface of said first transparent substrate;

an alignment layer on a first surface of said first transparent substrate to cover said transparent electrode;

a second transparent substrate having a first surface facing said first surface of said first transparent substrate;

a transparent electrode on a first surface of said second transparent substrate;

an alignment layer on a first surface of said second transparent substrate to cover said transparent electrode;

a power supply for placing a voltage between said transparent electrodes;

a plurality of grooves formed on at least one selected from said first surface of said first transparent substrate and said first surface of said second transparent substrate;

a plurality of spaces divided by ridges of said grooves; and a liquid crystal layer sandwiched by said first and second substrates.

8. A free-space optical interconnector as claimed in claim 7, wherein said grooves has a shape of toothed edges of a saw in cross section, and each one of said grooves is formed as in the shape of a right-angled triangle having an inclined surface and a vertical surface in cross section.

9. A free-space optical interconnector as claimed in claim 7, wherein said liquid crystal layer is comprised of a plurality of liquid crystal cells each of which is shaped like a right-triangle in cross section and placed in a different one of said spaces with adjacent liquid cells to an extent of without causing a bad influence on each other.

10. A free-space optical interconnector as claimed in claim 7, wherein a thickness of said second transparent substrate is gradually reduced to form an inclined flat surface thereof.

11. A free-space optical interconnector as claimed in claim 7, wherein at least one of said transparent electrodes is divided into a plurality of electrode segments as rectangular patterns of dots so as to correspond to incident beams.

12. A free-space optical interconnector as claimed in claim 7, further comprising:

thin film transistors corresponding to the respective segments of said transparent electrode provided on said first and second transparent substrates.

13. A free-space optical interconnector as claimed in claim 7, further comprising:

a first birefringent plate placed on an input side of said free-space optical interconnector;

a second birefringent plate placed on an output side of said free-space optical interconnector;

a plurality of $\lambda/2$ plates placed on an output side of said first birefringent plate where p-polarized beams impinges on a surface each of said respective $\lambda/2$ plates; and a plurality of $\lambda/2$ plates placed on an input side of said second birefringent plate where s-polarized beams impinges on a surface each of said respective $\lambda/2$ plates.

14. A free-space optical interconnector as claimed in claim 7, further comprising:

a two-dimensional optical detector array for detecting an output light intensity, placed on an output side of said free-space optical interconnector; and a feedback controller for controlling a driving voltage to obtain a maximum value of said output light intensity at said two-dimensional optical detector array.

15. An optical switch comprising:

a two-dimensional optical gate switch array having a plurality of pixels where each pixel has a light-input portion and a light-modulating portion and output beams are generated by putting readout beams into said light-modulating portion;

a polarization beam splitter;

a $\lambda/4$ plate placed between said two-dimensional optical gate switch array and a first surface of said polarization beam splitter; and a liquid crystal microprism array placed in close proximity to a second surface of said polarization beam splitter facing said first surface of said polarization beam splitter, said liquid crystal microprism array having a first transparent substrate, a transparent electrode divided into a plurality of electrode segments on a first surface of said first transparent substrate, an alignment layer on said first surface of said first transparent substrate to cover said transparent electrode, a second transparent substrate having a first surface facing said first surface of said first transparent substrate, a transparent electrode on said first surface of said second transparent substrate, an alignment layer on said first surface of said second transparent substrate to cover said transparent electrode, a power supply for placing a voltage between said transparent electrodes, a plurality of grooves formed on at least one selected from said first surface of said first transparent substrate and said first surface of said second transparent substrate, a plurality of spaces divided by ridges of said grooves, and a liquid crystal layer sandwiched by said first and second substrates, wherein a group of input optical beams are inputted into said light-input portion of said two-dimensional gate switch array, and a group of readout optical beams are input to said polarization beam splitter, reflect toward said two-dimensional optical gate switch, passed through said $\lambda/4$ plate, modulated and reflected by said light modulator portion of said two dimensional optical gate switch, and passed through said $\lambda/4$ plate, said polarization beam splitter, and said liquid crystal microprism array, in that order, to generate output beams.

16. An optical switch as claimed in claim 15, further comprising:

a second liquid crystal microprism array placed in close proximity to a third surface of said polarization beam splitter, wherein predetermined numbers of readout beams are inputted into said polarization beam splitter through said second liquid crystal microprism array and said predetermined numbers of readout beams are outputted from said polarization beam splitter to converge at one of said pixels of said two-dimensional optical gate switch array.

17. An optical switch as claimed in claim 15, further comprising:

a third liquid crystal microprism array or a third free-space optical beam interconnector are placed between said two-dimensional optical gate switch array and said polarization beam splitter.

18. An optical switch as claimed in claim 15, wherein said optical switch is provided as a second stage of multiple-staged optical switches and optically connected with another optical switch formed as a first stage, where predetermined numbers of output beams from said first stage is converged at a point of said first stage.

19. An optical switch as claimed in claim 15, wherein said optical switch is provided as a second stage of multiple-staged optical switches and optically connected with another optical switch formed as a first stage having a two-dimensional optical gate switch array for generating a predetermined numbers of output beams which are converged at one of input pixels of said two-dimensional optical gate switch array of said second stage.

* * * * *

UNITED STATES PATENT AND TRADEMARK OFFICE
CERTIFICATE OF CORRECTION

PATENT NO. : 5,648,859
DATED : July 15, 1997
INVENTOR(S) : HIRABAYASHI et al

It is certified that error appears in the above-indentified patent and that said Letters Patent is hereby corrected as shown below:

Title page, Item [73] Assignee, change:

"Telephone & Telegraph" to --Telegraph & Telephone--

Signed and Sealed this

Ninth Day of December, 1997

*Attest:*

BRUCE LEHMAN

*Attesting Officer*     *Commissioner of Patents and Trademarks*